US008514768B2

(12) United States Patent
Noh et al.

(10) Patent No.: US 8,514,768 B2
(45) Date of Patent: Aug. 20, 2013

(54) METHOD AND APPARATUS FOR TRANSMITTING REFERENCE SIGNAL PERFORMED BY RELAY STATION IN WIRELESS COMMUNICATION SYSTEM

(75) Inventors: Min Seok Noh, Anyang-si (KR); Kyu Jin Park, Anyang-si (KR); Jae Hoon Chung, Anyang-si (KR); Sung Ho Moon, Anyang-si (KR); Seung Hee Han, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 223 days.

(21) Appl. No.: 13/131,686

(22) PCT Filed: Dec. 10, 2009

(86) PCT No.: PCT/KR2009/007385
§ 371 (c)(1),
(2), (4) Date: May 27, 2011

(87) PCT Pub. No.: WO2010/068047
PCT Pub. Date: Jun. 17, 2010

(65) Prior Publication Data
US 2011/0228722 A1    Sep. 22, 2011

Related U.S. Application Data

(60) Provisional application No. 61/121,555, filed on Dec. 11, 2008, provisional application No. 61/153,982, filed on Feb. 20, 2009, provisional application No. 61/224,049, filed on Jul. 8, 2009.

(51) Int. Cl.
*H04B 7/14* (2006.01)
(52) U.S. Cl.
USPC .......................................... 370/315
(58) Field of Classification Search
USPC ......... 370/203, 204–215, 229–240, 310–337, 370/338–350, 351–394, 395.1, 395.3, 395.4, 370/395.41, 395.42, 395.5, 395.52, 395.53, 370/412–421, 431–457, 458–463, 464–497, 370/498–522, 523–520, 521–529
See application file for complete search history.

(56) References Cited

U.S. PATENT DOCUMENTS

| | | |
|---|---|---|
| 2007/0155315 A1 | 7/2007 | Lee et al. |
| 2008/0043710 A1 | 2/2008 | Zhou et al. |
| 2010/0080139 A1* | 4/2010 | Palanki et al. ............... 370/252 |
| 2011/0096783 A1* | 4/2011 | Cai et al. ................... 370/395.4 |

* cited by examiner

*Primary Examiner* — Jung-Jen Liu
(74) *Attorney, Agent, or Firm* — Birch, Steart, Kolasch & Birch, LLP

(57) ABSTRACT

A method of transmitting a reference signal performed by a Relay Station (RS) in a wireless communication system comprises allocating a guard time in the front of a backhaul subframe or the end of the backhaul subframe, the backhaul subframe comprising a plurality of slots, each of the plurality of slots comprising a plurality of Orthogonal Frequency Division Multiplexing (OFDM) symbols, and the guard time being a time interval for switching between an access link and a backhaul link, and transmitting a Demodulation Reference Signal (DMRS) to a Base Station (BS) in an OFDM symbol of the backhaul subframe. The OFDM symbol for the DMRS is not over-lapped with the guard time.

6 Claims, 37 Drawing Sheets

☒ : DMRS

▨ : Guard time

☒ : DMRS

▨ : Guard time (a)

(b)

(c)

☒ : DMRS

▨ : Guard time (a)

(b)

(c)

☒ : DMRS

▦ : SRS

▨ : Guard time (a)

(b)

(c)

☒ : DMRS

▦ : SRS

▨ : Guard time

METHOD AND APPARATUS FOR TRANSMITTING REFERENCE SIGNAL PERFORMED BY RELAY STATION IN WIRELESS COMMUNICATION SYSTEM

CROSS REFERENCE TO RELATED APPLICATIONS

This application is the National Phase of PCT/KR2009/007385 filed on Dec. 10, 2009, which claims priority under 35 U.S.C. 119(e) to U.S. Provisional Application No. 61/121,555 filed on Dec. 11, 2008, U.S. Provisional Application No. 61/153,982 filed on Feb. 20, 2009, and U.S. Provisional Application No. 61/224,049 filed on Jul. 8, 2009, all of which are hereby expressly incorporated by reference into the present application.

TECHNICAL FIELD

The present invention relates to wireless communication and, more particularly, to a method and apparatus for transmitting a reference signal performed by a relay station in a wireless communication system.

BACKGROUND ART

The next-generation multimedia wireless communication systems which are recently being actively researched are required to process and transmit various pieces of information, such as video and wireless data as well as the initial voice-centered services. The 4th generation wireless communication systems which are now being developed subsequently to the 3rd generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, Inter-Symbol Interference (ISI), and the Doppler Effect resulting from the mobility of a user equipment. A variety of techniques are being developed in order to overcome the abnormal characteristics of the wireless channel and to increase the reliability of wireless communication.

Technology for supporting reliable and high-speed data service includes Orthogonal Frequency Division Multiplexing (OFDM), Multiple Input Multiple Output (MIMO), and so on.

An OFDM system is being considered after the 3rd generation system which is able to attenuate the ISI effect with low complexity. The OFDM system converts symbols, received in series, into N (N is a natural number) parallel symbols and transmits them on respective separated N subcarriers. The subcarriers maintain orthogonality in the frequency domain. It is expected that the market for mobile communication will shift from the existing Code Division Multiple Access (CDMA) system to an OFDM-based system.

MIMO technology can be used to improve the efficiency of data transmission and reception using multiple transmission antennas and multiple reception antennas. MIMO technology includes spatial multiplexing, transmit diversity, beam-forming and the like. An MIMO channel matrix according to the number of reception antennas and the number of transmission antennas can be decomposed into a number of independent channels. Each of the independent channels is called a layer or stream. The number of layers is called a rank.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmission signal by compensating for the distortion of the transmission signal resulting from a sudden change in the environment, caused by such fading, is called channel estimation. Channel estimation, in general, is performed using a reference signal (RS) which is known to a transmitter and a receiver.

In OFDM systems, a method of assigning a reference signal includes a method of assigning a reference signal to all subcarriers and a method of assigning a reference signal between data subcarriers. The method of assigning a reference signal to all sub-carriers is performed using a signal comprising only a reference signal, such as a preamble signal, in order to achieve the performance of channel estimation. If this method is used, the performance of channel estimation can be improved as compared with the method of assigning a reference signal between data subcarriers because, in general, the density of reference signals is high. However, the method of assigning a reference signal between data subcarriers is used in order to increase the amount of transmission data because the amount of transmission data is reduced. If such a method is used, the density of reference signals is reduced, thereby deteriorating the performance of channel estimation. To minimize such deterioration, the reference signals should be properly arranged.

Meanwhile, a wireless communication system including relay stations is recently being developed. The relay station functions to expand the cell coverage and improve the performance of transmission. If a base station provides services to a user equipment, placed at the boundary of the coverage of the base station, through a relay station, the cell coverage can be expanded. Furthermore, if a relay station improves reliability in the transmission of signals between a base station and a user equipment, the amount of transmission data can be increased. Although a user equipment is placed within the cell coverage of a base station, it may use a relay station placed in the shadow region.

Uplink and downlink between a base station and a relay station is a backhaul link, and uplink and the downlink between a relay station and a user equipment is an access link. Hereinafter, a signal transmitted through the backhaul link is called a backhaul signal, and a signal transmitted through the access link is an access signal. If a large amount of radio resources are allocated in order to transmit a backhaul signal between a base station and a relay station, radio resources necessary to transmit an access signal between the relay station and a user equipment become short, and the efficiency in the use of the radio resources is lowered.

In the backhaul link, there is a need for a method of efficiently transmitting a reference signal.

DISCLOSURE OF INVENTION

Technical Problem

The present invention provides a method and apparatus for transmitting a reference signal performed by a relay station in a wireless communication system.

Technical Solution

In an aspect, a method of transmitting a reference signal performed by a Relay Station (RS) in a wireless communication system is provided. The method includes allocating a guard time in the front of a backhaul subframe or the end of the backhaul subframe, the backhaul subframe comprising a plurality of slots, each of the plurality of slots comprising a plurality of Orthogonal Frequency Division Multiplexing (OFDM) symbols, the guard time being a time interval for switching between access link and backhaul link, and transmitting a Demodulation Reference Signal (DMRS) to a base station (BS) in a OFDM symbol of the backhaul subframe, wherein the OFDM symbol for the DMRS is not overlapped with the guard time. The guard time may comprise the first one or two OFDM symbols of the backhaul subframe or the last one or two OFDM symbols of the backhaul subframe. The guard time may comprise the first and the last OFDM symbol of the backhaul subframe.

The guard time may comprise the first ½ and the last ½ OFDM symbol of the backhaul subframe. ½ symbol subsequent to the guard time allocated to the first ½ symbol of the backhaul subframe may be used for transmission of at least one of a data, a control signal and a reference signal. The backhaul subframe may be delayed for one of ½ OFDM symbols, 1 OFDM symbol, and 1½ OFDM symbols with reference to a base station subframe which is a uplink subframe transmitted to the base station by a user equipment (UE) corresponding with the backhaul subframe, wherein a position of a OFDM symbol of the BS subframe in which the DMRS is received by the BS is the same as a position of the OFDM symbol for the DMRS. The backhaul subframe may be advanced for one of ½ OFDM symbols, 1 OFDM symbol, and 1½ OFDM symbols with reference to a base station subframe which is a uplink subframe transmitted to the base station by a user equipment (UE) corresponding with the backhaul subframe, wherein a position of a OFDM symbol of the BS subframe in which the DMRS is received by the BS is the same as a position of the OFDM symbol for the DMRS.

A number of the slot may be two. A number of the OFDM symbols in the slot may be six or seven. The method may further include transmitting a sounding reference signal (SRS) to the BS in a OFDM symbol of the backhaul subframe, wherein the OFDM symbol for the SRS is not overlapped with the guard time. The SRS may be transmitted in the first OFDM symbol of the backhaul subframe or the last OFDM symbol of the backhaul subframe, the backhaul subframe excluding the guard time.

In another aspect, a Relay Station (RS) in a wireless communication system is provided. The RS includes a RF unit, and a processor operatively coupled to the RF unit and configured to allocate a guard time in the front of a backhaul subframe or the end of the backhaul subframe, the backhaul subframe comprising a plurality of slots, each of the plurality of slots comprising a plurality of Orthogonal Frequency Division Multiplexing (OFDM) symbols, the guard time being a time interval for switching between access link and backhaul link, and transmit a demodulation reference signal (DMRS) to a base station (BS) in a OFDM symbol of the backhaul subframe, wherein the OFDM symbol for the DMRS is not overlapped with the guard time.

Advantageous Effects

The performance of channel estimation can be improved by assigning a position where a Demodulation Reference Signal (DMRS) or a Sounding Reference Signal (SRS) are relayed with consideration taken of the guard time.

MODE FOR THE INVENTION

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16(WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

LTE/LTE-A is chiefly described as an example in order to clarify the description, but the technical spirit of the present invention is not limited to LTE/LTE-A.

Figure 1:
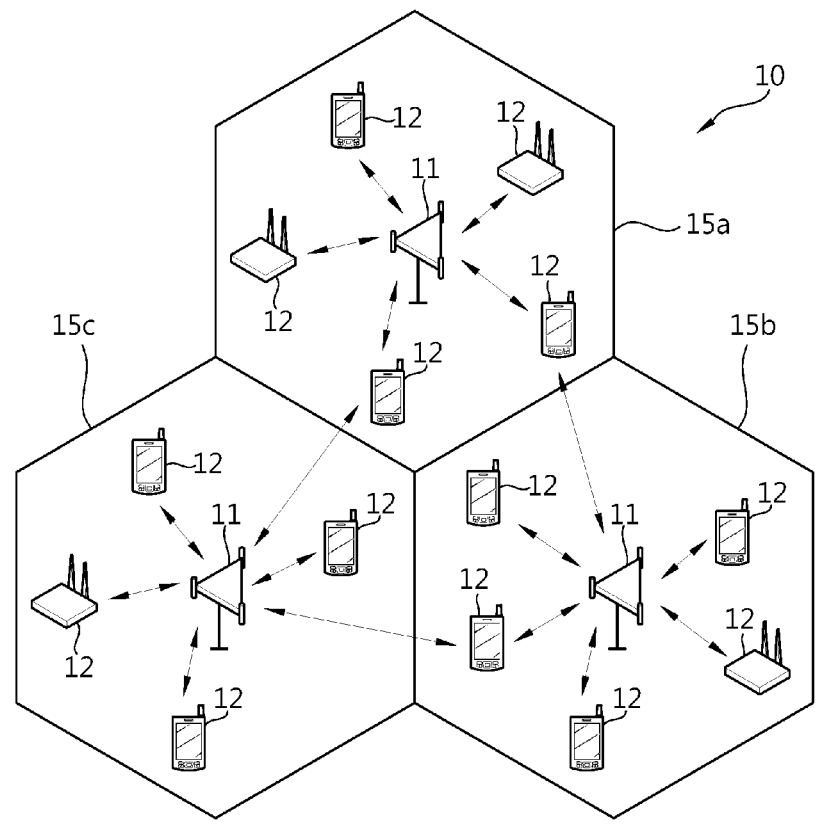
FIG. 1 shows a wireless communication system.

FIG. 1 shows a wireless communication system.

Referring to FIG. 1, the wireless communication system 10 includes one or more Base Stations (BSs) 11. The BSs 11 provide communication services to respective geographical areas (in general called 'cells') 15*a*, 15*b*, and 15*c*. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
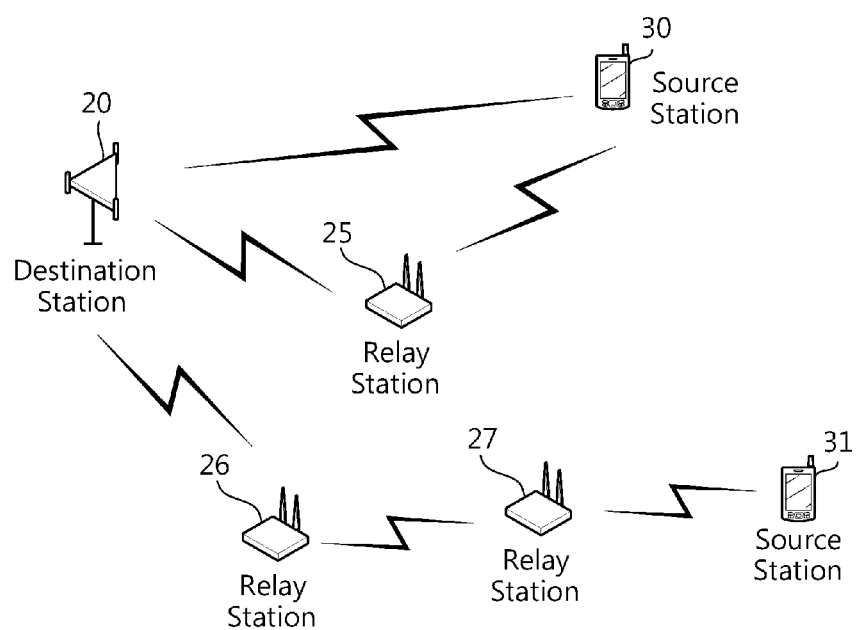
FIG. 2 shows a wireless communication system using relay stations.

FIG. 2 shows a wireless communication system using relay stations.

In uplink transmission, a source station can be a user equipment, and a destination station can be a base station. In downlink transmission, a source station can be a base station, and a destination station can be a user equipment. A relay station may be a user equipment, and an additional relay station can be deployed. A base station can perform functions, such as connectivity, management, control, and resource allocation between a relay station and a user equipment.

Referring to FIG. 2, a destination station 20 communicates with a source station 30 via a relay station 25. In uplink transmission, the source station 30 transmits uplink data to the destination station 20 and the relay station 25. The relay station 25 retransmits the received data. Further, the destination station 20 communicates with a source station 31 via relay stations 26 and 27. In uplink transmission, the source station 31 transmits uplink data to the destination station 20 and the relay stations 26 and 27. The relay stations 26 and 27 retransmit the received data sequentially or at the same time.

Although one destination station 20, the three relay stations 25, 26, and 27, and the two source stations 30 and 31 are illustrated, the present invention is not limited to the above example. It is to be noted that the number of destination stations, relay stations, and source stations included in a wireless communication system is not limited.

Any method (for example, Amplify and Forward (AF) or Decode and Forward (DF)) can be used as a relay method for a relay station. The technical spirit of the present invention is not limited to the methods.

Figure 3:
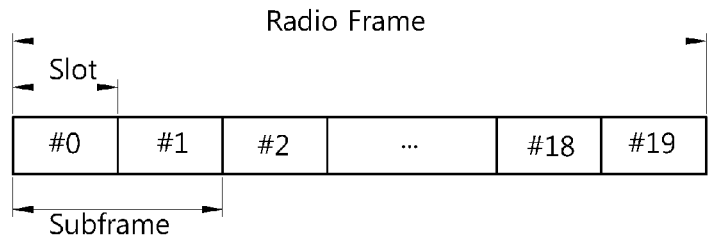
FIG. 3 shows the structure of a radio frame in the 3GPP LTE specifications.

FIG. 3 shows the structure of a radio frame in the 3GPP LTE specifications. For the radio frame structure, reference can be made to Paragraph 5 of 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)".

Referring to FIG. 3, the radio frame includes ten subframes, and one subframe includes two slots. The slots within the radio frame are allocated slot numbers from #0 to #19. The time that it takes to transmit one subframe is called a Transmission Time Interval (TTI). The TTI can be called a scheduling unit for data transmission. For example, the length of one radio frame can be 10 ms, the length of one subframe can be 1 ms, and the length of one slot may be 0.5 ms.

One slot includes a plurality of Orthogonal Frequency Division Multiplexing (OFDM) symbols in the time domain and a plurality of subcarriers in the frequency domain. The OFDM symbol is used to represent one symbol period because the 3GPP LTE specifications use OFDMA in the downlink. The OFDM symbol can be called another terminology according to the multi-access method. For example, in the case in which SC-FDMA is used as an uplink multi-access method, corresponding symbols can be called SC-FDMA symbols. A Resource Block (RB) is the unit of resource allocation, and it includes a plurality of consecutive subcarriers in one slot. The structure of a radio frame is only an example. The number of subframes included in a radio frame, the number of slots included in a subframe, or the number of OFDM symbols included in a slot can be changed in various ways.

In the 3GPP LTE specifications, one slot is defined to include seven OFDM symbols in a normal Cyclic Prefix (CP), and one slot is defined to include six OFDM symbols in the extended CP.

Figure 4:
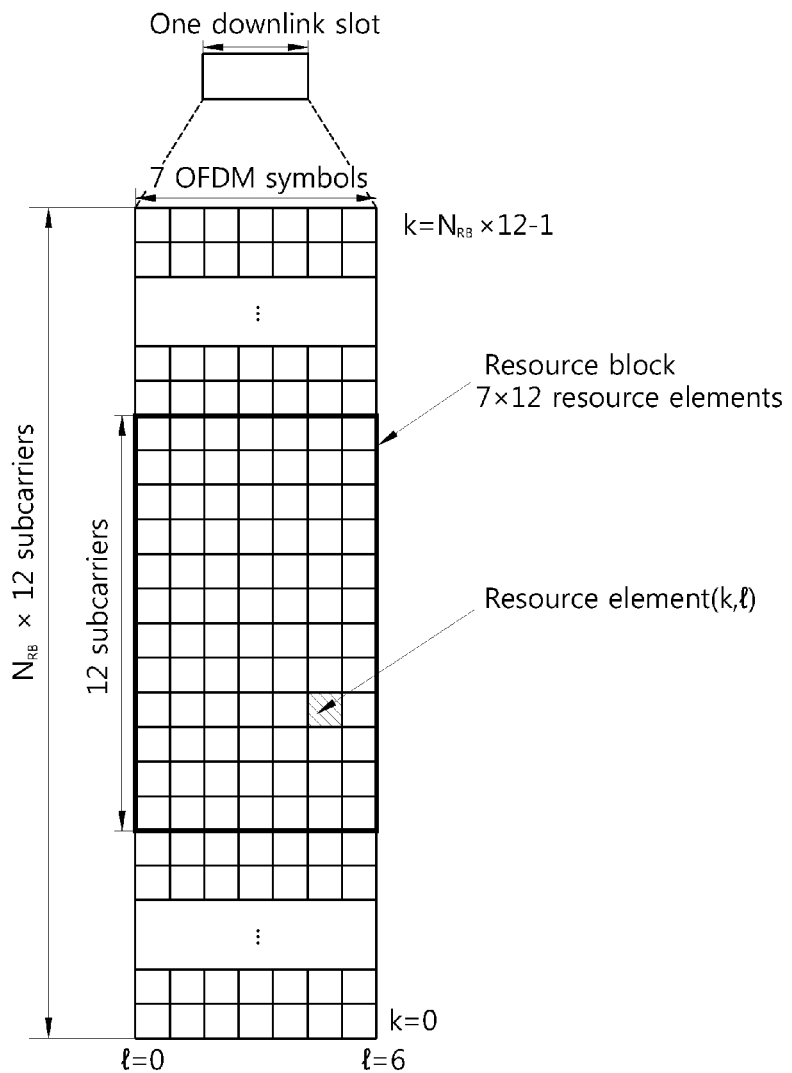
FIG. 4 shows an example of a resource grid for one downlink slot.

FIG. 4 shows an example of a resource grid for one downlink slot.

The downlink slot includes a plurality of OFDM symbols in the time domain and $N_{RB}$ resource blocks in the frequency domain. The number of resource blocks $N_{RB}$ included in a downlink slot is dependent on a downlink transmission bandwidth set in a cell. For example, in the LTE system, the number of resource blocks $N_{RB}$ may be one of 60 to 110. One resource block includes a plurality of subcarriers in the frequency domain. The structure of an uplink slot can be identical with that of the downlink slot.

Each of elements on the resource grid is called a resource element. The resource element on the resource grid can be identified by an index pair (k,l) within a slot. Here, k(k= 0, ..., $N_{RB} \times 12-1$) denotes a subcarrier index in the frequency domain, and l(l=0, ..., 6) denotes an OFDM symbol index in the time domain.

In this case, one resource block is illustrated to include 7×12 resource elements, including 7 OFDM symbols in the time domain and 12 subcarriers in the frequency domain. However, the number of OFDM symbols and the number of subcarriers within a resource block are not limited to the 7×12 resource elements. The number of OFDM symbols and the number of subcarriers can be variously changed depending on the length of a CP, frequency spacing, and so on. For example, in the normal CP, the number of OFDM symbols can be 7, and in the extended CP, the number of OFDM symbols can be 6. In one OFDM symbol, the number of subcarriers can be one of 128, 256, 512, 1024, 1536, and 2048.

Figure 5:
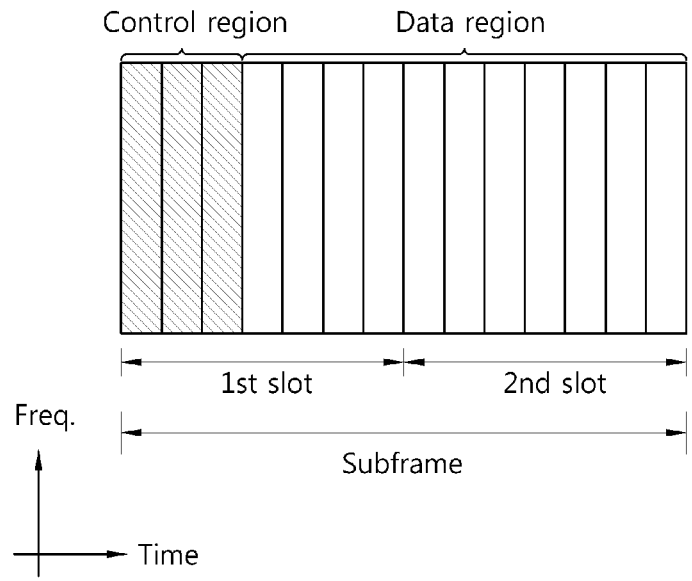
FIG. 5 shows the structure of a downlink subframe.

FIG. 5 shows the structure of a downlink subframe.

The downlink subframe includes two slots in the time domain. Each of the slots includes 7 OFDM symbols in the normal CP. A maximum of three OFDM symbols of the first slot within the subframe correspond to a control region to which control channels are allocated, and the remaining OFDM symbols correspond to a data region to which Physical Downlink Shared Channels (PDSCHs) are allocated. Downlink control channels used in the 3GPP LTE include a Physical Control Format Indicator Channel (PCFICH), a Physical Downlink Control Channel (PDCCH), a Physical Hybrid-ARQ Indicator Channel (PHICH), and so on. The PCFICH transmitted in the first OFDM symbol of a subframe carries information about the number of OFDM symbols (that is, the size of a control region) which is used to transmit control channels within the subframe. The PHICH carries an Acknowledgement (ACK)/Not-Acknowledgement (NACK) signal for an uplink Hybrid Automatic Repeat Request (HARM). In other words, an ACK/NACK signal for uplink data transmitted by a user equipment is transmitted on the PHICH. Control information transmitted through the PDCCH is called Downlink Control Information (DCI). The DCI indicates uplink or downlink scheduling information, an uplink transmission power control command for specific user equipment groups, etc.

Figure 6:
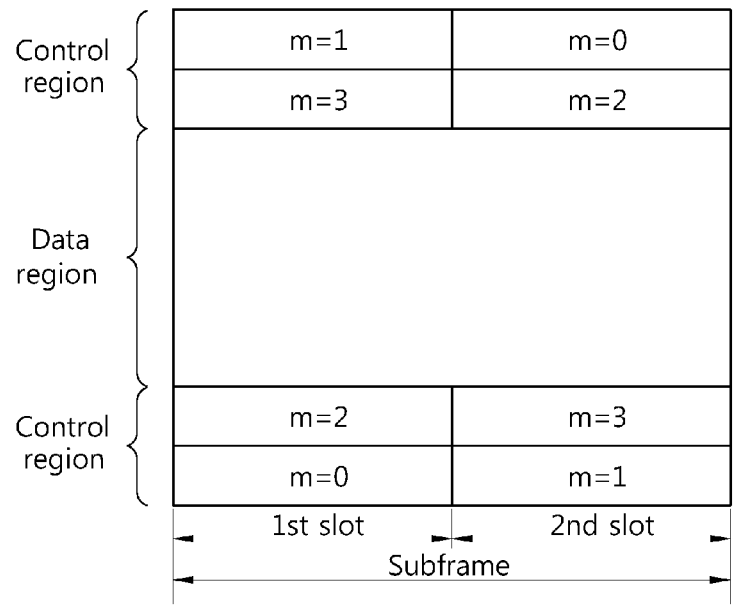
FIG. 6 shows the structure of an uplink subframe.

FIG. 6 shows the structure of an uplink subframe.

The uplink subframe can be divided into a control region and a data region in the frequency domain. The control region is allocated with a Physical Uplink Control Channel (PUCCH) on which uplink control information is transmitted. The data region is allocated with a Physical Uplink Shared Channel (PUSCH) on which data are transmitted. To maintain the characteristic of a single carrier, a user equipment does not transmit the PUCCH and the PUSCH at the same time. The PUCCHs of one user equipment forms a RB pair within a subframe and are then allocated. The RBs included in the RB pair occupy different subcarriers of respective slots. It is said that a RB pair allocated to a PUCCH is frequency-hopped at the slot boundary.

A reference signal (RS) is used for channel estimation. Channel estimation is necessary for user scheduling or data demodulation or both. Furthermore, the RS can also be used to measure the quality of a channel for its own cell or other cells as well as channel estimation. The reference signal is known to both a transmitter and a receiver and is also called a pilot. A subcarrier used to transmit the reference signal is called a reference signal subcarrier, and a resource element used to transmit data is called a data subcarrier.

The reference signals, in general, are transmitted in a sequence. A specific sequence can be used as the reference signal sequence without special restrictions. A Phase Shift Keying (PSK)-based computer-generated sequence can be used as the reference signal sequence. PSK can include, for example, Binary Phase Shift Keying (BPSK), Quadrature Phase Shift Keying (QPSK), etc. Alternatively, a Constant Amplitude Zero Auto-Correlation (CAZAC) sequence can be used as the reference signal sequence. The CAZAC sequence can include, for example, a Zadoff-Chu (ZC)-based sequence, a ZC sequence with cyclic extension, and a ZC sequence with truncation. Alternatively, a Pseudo-random (PN) sequence can be used as the reference signal sequence. The PN sequence can include, for example, m-sequence, a computer-generated sequence, a Gold sequence, and a Kasami sequence. Further, a cyclically shifted sequence can be used as the reference signal sequence.

The reference signal sequence $R_{u,v}^{(\alpha)}(n)$ can be expressed by Equation 1.

Math Figure 1

$$r_{u,v}^{(\alpha)}(n) = e^{j\alpha n} \bar{r}_{u,v}(n), \; 0 \leq n \leq M_{SC}^{RS} \qquad \text{[Math 1]}$$

In Equation 1, α is a cyclic shift, and $\bar{r}_{u,v}(n)$ is a basic sequence. $M_{SC}^{RS}$ is the length of a reference signal sequence.

$M_{SC}^{RS} = m \cdot N_{SC}^{RB}$, $1 \leq m \leq N_{RB}^{max,UL}$, and $N_{SC}^{RB}$ is the size of a resource block expressed by the number of subcarriers in the frequency domain. $N_{RB}^{max,UL}$ is a maximum uplink bandwidth configuration expressed by a multiple of $N_{SC}^{RB}$. A plurality of the reference signal sequences can be defined by variously changing the cyclic shift α on the basis of a single basic sequence.

The reference signal includes two kinds of signals, such as a Demodulation Reference Signal (DMRS) and a Sounding Reference Signal (SRS). The DMRS is a reference signal used in channel estimation for demodulating a received signal. The DMRS can also be called a dedicated reference signal, a user-specific reference signal, or the like. The DMRS can be combined with transmission of a PUSCH or a PUCCH. The SRS is a reference signal transmitted from a user equipment to a base station for uplink scheduling. The base station estimates an uplink channel through a received SRS and uses the estimated uplink channel for uplink scheduling. The SRS is not combined with transmission of a PUSCH or a PUCCH.

A sequence $r^{PUSCH}$ of a DMRS for a PUSCH can be expressed by Equation 2.

Math Figure 2

$$r^{PUSCH}(m \cdot M_{SC}^{RS} + n) = r_{u,v}^{(\alpha)}(n) \quad \text{[Math. 2]}$$

In Equation 2, m=0,1, n=0, . . . , $M_{SC}^{RS}$−1, and $M_{SC}^{RS} = M_{SC}^{PUSCH} \cdot M_{SC}^{PUSCH}$ is a scheduled bandwidth for uplink transmission which is expressed by the number of subcarriers. $R_{u,v}^{(\alpha)}(n)$ is a reference signal sequence. The $r^{PUSCH}$ can be mapped to a resource block used for PUSCH transmission. The $r^{PUSCH}$ can be mapped to a fourth (l=3) OFDM symbol from the front in the case of the normal CP and to a third (l=2) OFDM symbol from the front in the case of the extended CP in each of the slots constituting a resource block. The DMRS can be transmitted through the mapped resources.

A sequence $r^{SRS}$ of an SRS can be expressed by Equation 3.

Math Figure 3

$$r^{SRS}(n) = r_{u,v}^{(\alpha)}(n) \quad \text{[Math. 3]}$$

The sequence $r^{SRS}$ is also mapped to a resource unit, and an SRS can be transmitted through the resource unit.

Some embodiments of a proposed method of transmitting a reference signal are described below.

In a wireless communication system including relay stations, when an OFDM symbol in which a reference signal is transmitted is allocated, a guard time must be taken into consideration. A relay station is unable to transmit data to a base station at the same time when receiving data from a user equipment because of self-interference. A subframe in which data are received from the user equipment and a subframe in which data are transmitted to the base station need to be distinguished from each other. The guard time can be allocated between the subframes. In other words, the guard time can be a time interval for switching between the backhaul link and the access link. The guard time can be allocated to ½ or 1½ OFDM symbol or the guard time can be allocated to one or more OFDM symbols. The guard time can be placed at the first position or the end position of a subframe or the guard time can be placed at both the first position and the end position of a subframe. The relay station relays the reference signal, received from the user equipment, back to the base station, and so must consider resource allocation for the backhaul link between the base station and the relay station to an uplink subframe with respect to a reference signal. The structures of subframes illustrated in the embodiments below show the structures of backhaul subframes, each using the backhaul link in uplink. However, the present invention is not limited thereto.

A proposed method of transmitting a reference signal in the case in which one OFDM symbol is allocated to the guard time is described below.

Figure 7:
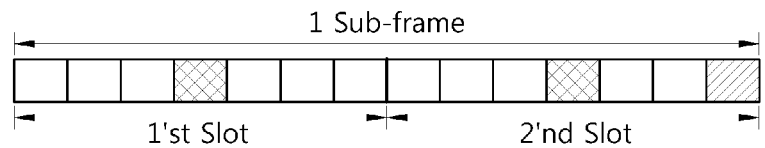
FIG. 7 shows an example of a backhaul subframe structure when a guard time is placed at the end of the backhaul subframe in a normal cyclic prefix (CP).

FIG. 7 shows an example of a backhaul subframe structure when a guard time is placed at the end of the backhaul subframe in the normal CP. In the normal CP, one slot includes seven symbols. The guard time is allocated to the seventh symbol of a second slot. Accordingly, in the case in which the guard time is excluded, the first slot of each backhaul subframe includes seven symbols, and the second slot thereof includes six symbols. A DMRS is transmitted in the fourth symbol of each of the two slots.

Figure 8:
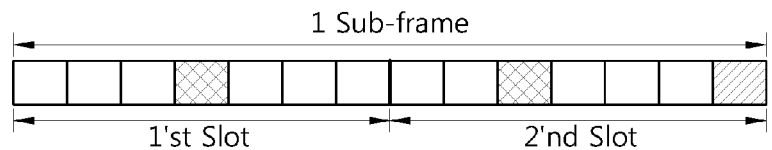
FIG. 8 shows an example of a backhaul subframe structure according to a proposed method of transmitting a reference signal when the guard time is placed at the end of the backhaul subframe in the normal CP.

FIG. 8 shows an example of a backhaul subframe structure according to a proposed method of transmitting a reference signal when the guard time is placed at the end of the backhaul subframe in the normal CP.

In the backhaul subframe structure of FIG. 7, the DMRS of the second slot is advanced by one symbol and transmitted. That is, the DMRS is transmitted in the third symbol of the second slot. In the case in which a symbol allocated to the guard time is excluded, positions in which DMRSs are transmitted are symmetrical to each other within the backhaul subframe. Since time spacing between resources in which the reference signals are transmitted in the time domain is narrowed, the performance of channel estimation can be improved in an environment in which the channel state is rapidly changed. Furthermore, since the resources allocated to the reference signals are changed, there may be an effect caused by Code Division Multiplexing (CDM) of symbols to which data are allocated in the non-relay subframe and symbols to which the reference signal is allocated in the relay subframe.

Figure 9:
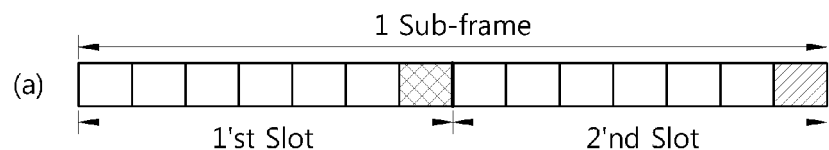
FIGS. 9 and 10 show another example of backhaul subframe structures according to a proposed method of transmitting a reference signal when the guard time is placed at the end of the backhaul subframe in the normal CP.
Figure 9:
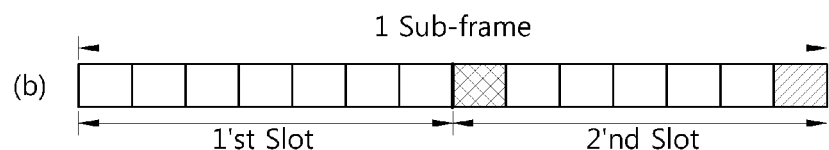
Figure 10:
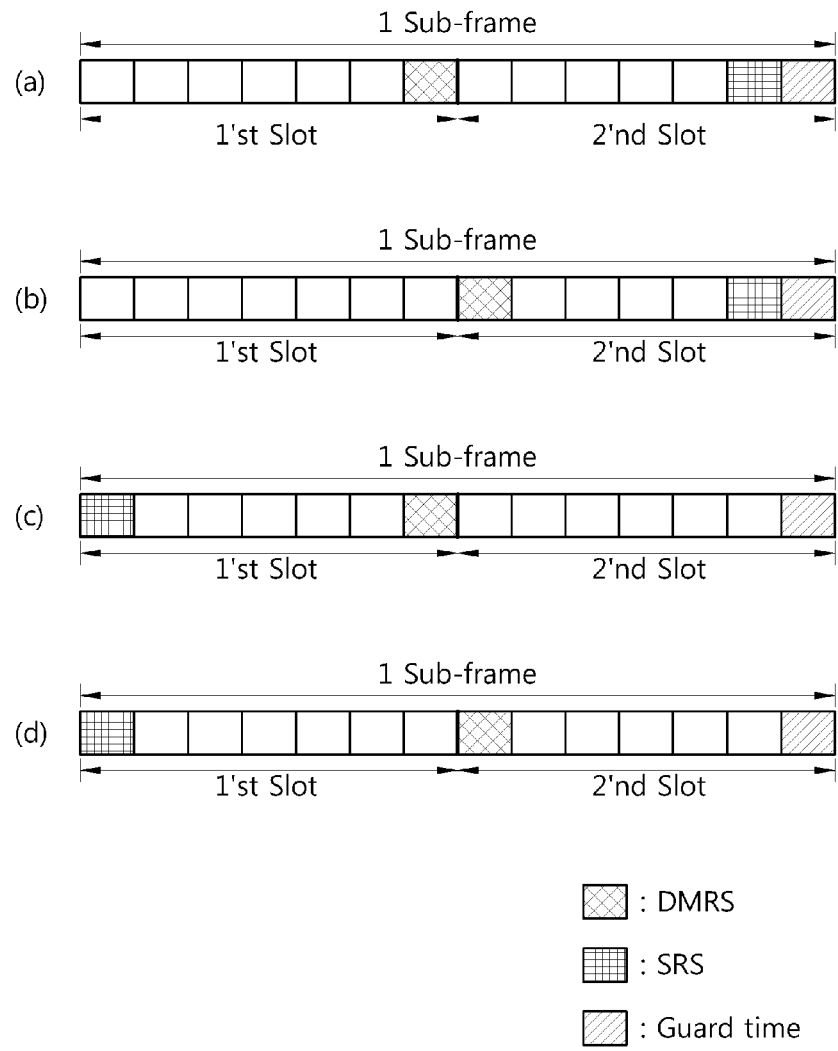

FIGS. 9 and 10 show another example of backhaul subframe structures according to a proposed method of transmitting a reference signal when the guard time is placed at the end of the backhaul subframe in the normal CP. If the mobility of a relay station is low such that the relay station is fixed, state of the channel between a base station and the relay station does not change a lot. To efficiently allocate resources, only one symbol can be allocated to the reference signal within the backhaul subframe. In this case, frequency hopping mode among slots which can be used for UL PUSCH transmission is turned off. Therefore, frequency hopping among slots is not operated. FIG. 9 shows the case in which an SRS is not transmitted. In FIG. 9-(a), a DMRS is transmitted in the last symbol of a first slot. In FIG. 9-(b), a DMRS is transmitted in the first symbol of a second slot. That is, according to the proposed method of transmitting a reference signal, a DMRS can be transmitted in a symbol placed in the middle of a backhaul subframe. According to the proposed method of transmitting a reference signal, in the state in which the channel state does not change a lot in the time domain, a robust channel estimation performance can be obtained. In particular, in the case in which a plurality of consecutive subframes is used as the backhaul link, a further improved channel estimation result can be obtained as compared with other subframe structure.

FIG. 10 shows the case in which an SRS is additionally transmitted.

In FIGS. 10-(a) and 10-(b), the SRS is transmitted in the sixth symbol of a second slot. In other words, in the case in which the guard time is excluded, the SRS is transmitted in the last symbol of the backhaul subframe. A base station performs channel-dependent scheduling using an SRS transmitted by a user equipment. Likewise, for channel-dependent scheduling of the backhaul link between a base station and a relay station, an SRS needs to be transmitted. In the case in which an SRS is used for channel-dependent scheduling, the SRS preferably is transmitted in the last symbol other than the guard time in the backhaul subframe. This is because the SRS can reflect the most recent channel. In FIG. 10-(a), a DMRS is transmitted in the seventh symbol of a first slot. In FIG. 10-(b), a DMRS is transmitted in the first symbol of the second slot. According to the proposed method of transmitting a reference signal, a robust channel estimation result can be obtained in a situation in which the channel state has been stabilized.

In FIGS. 10-(c) and 10-(d), an SRS is transmitted in the first symbol of a first slot. That is, the SRS is transmitted in the first symbol of the backhaul subframe. In the case in which an SRS is used for channel-dependent scheduling, the time for a base station to process the SRS can be considered, and the result of the processing can be applied to the next backhaul subframe. So it is preferable that the SRS is transmitted in the first symbol of the backhaul subframe. In this case, in consideration that only an OFDM symbol transmits the SRS is transmitted in the UL backhaul subframe, the base station does not need to wait the SRS transmitted for one subframe. So it gains in the time latency aspect. In this case, the SRS preferably is transmitted at the front of a backhaul subframe. In FIG. 10-(c), a DMRS is transmitted in the seventh symbol of a first slot, and in FIG. 10-(d), a DMRS is transmitted in the first symbol of a second slot.

Figure 11:
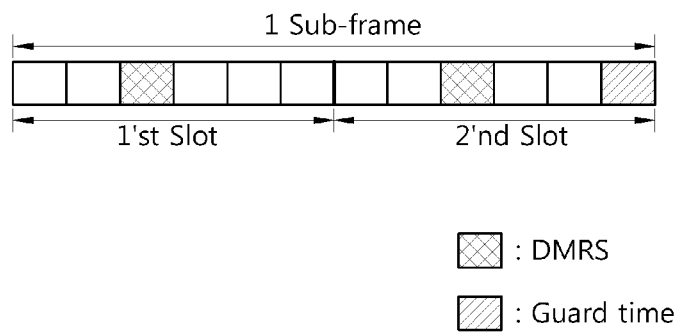
FIG. 11 shows an example of a backhaul subframe structure when a guard time is placed at the end of the backhaul subframe in the extended CP.

FIG. 11 shows an example of a backhaul subframe structure when a guard time is placed at the end of the backhaul subframe in the extended CP. In the case of an extended CP, one slot includes six symbols. The guard time is allocated to the sixth symbol of a second slot. A DMRS is transmitted in the third symbol of each of the two slots.

Figure 12:
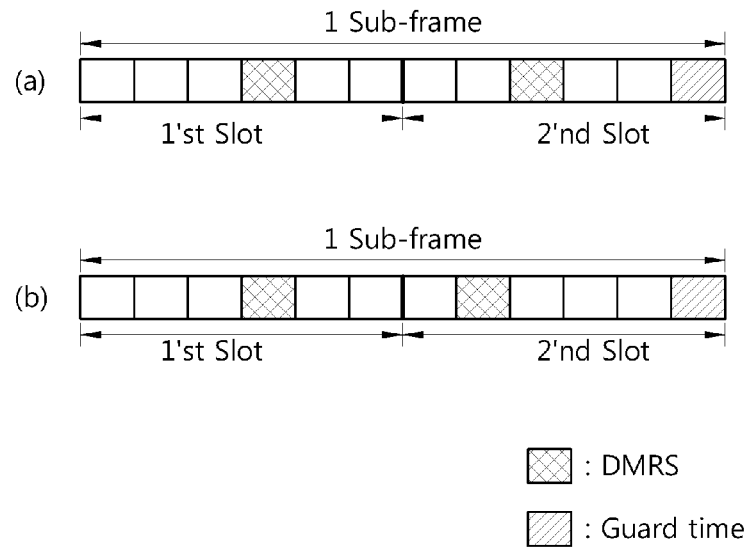
FIG. 12 shows an example of a backhaul subframe structure according to a proposed method of transmitting a reference signal when the guard time is placed at the end of the backhaul subframe in the extended CP.

FIG. 12 shows an example of a backhaul subframe structure according to a proposed method of transmitting a reference signal when the guard time is placed at the end of the backhaul subframe in the extended CP.

Referring to FIG. 12-(a), in the backhaul subframe structure of FIG. 11, the DMRS of the first slot is delayed by one symbol and then transmitted. That is, the DMRS is transmitted in the fourth symbol of the first slot. Referring to FIG. 12-(b), in the backhaul subframe structure of FIG. 12-(a), the DMRS of the second slot is advanced by one symbol and then transmitted. In other words, the DMRS is transmitted in the fourth symbol of the first slot and in the second symbol of the second slot.

Figure 13:
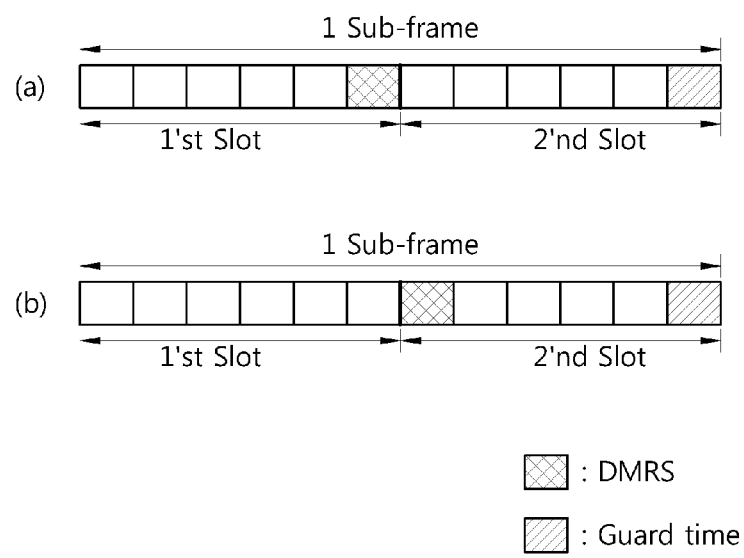
FIGS. 13 and 14 show another example of backhaul subframe structures according to a proposed method of transmitting a reference signal when the guard time is placed at the end of the backhaul subframe in the extended CP.
Figure 14:
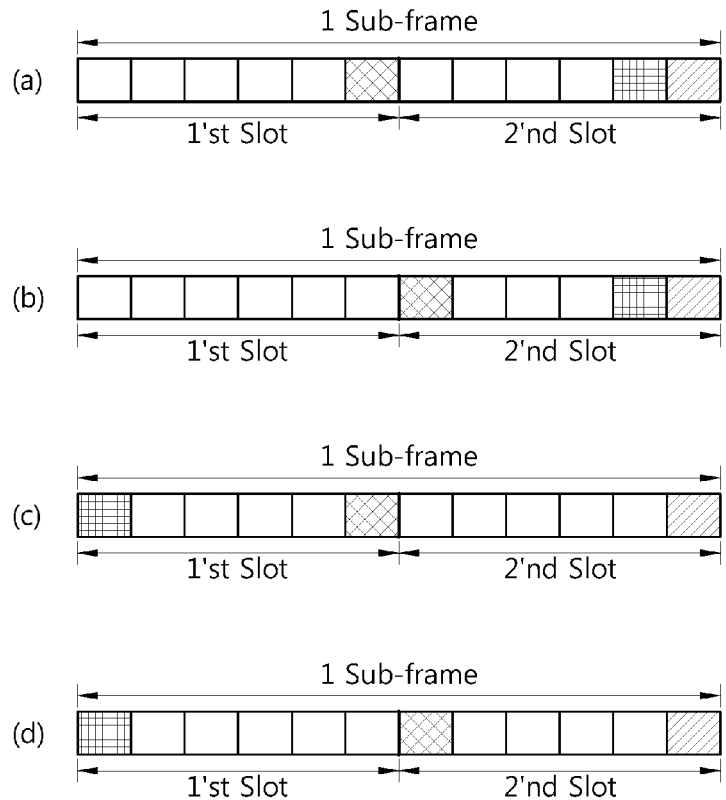

FIGS. 13 and 14 show another example of backhaul subframe structures according to a proposed method of transmitting a reference signal when the guard time is placed at the end of the backhaul subframe in the extended CP. This shows the case of non-slot hopping.

FIG. 13 shows the case in which an SRS is not transmitted. In FIG. 13-(a), a DMRS is transmitted in the sixth symbol of a first slot. In FIG. 13-(b), a DMRS is transmitted in the first symbol of a second slot. In other words, according to the proposed method of transmitting a reference signal, the DMRS can be transmitted in a symbol placed in the middle of a backhaul subframe. According to the proposed method of transmitting a reference signal, in a situation in which the channel state has been stabilized, a robust channel estimation result can be obtained. In particular, in the case in which a plurality of consecutive subframes is used as the backhaul link, a further improved channel estimation result as compared with other subframe structures can be obtained.

FIG. 14 shows the case in which an SRS is additionally transmitted.

In FIGS. 14-(a) and 14-(b), the SRS is transmitted in the fifth symbol of a second slot. That is, in the case in which the guard time is excluded, the SRS is transmitted in the last symbol of the backhaul subframe. In this case, the SRS can reflect the most recent channel. In FIG. 14-(a), a DMRS is transmitted in the sixth symbol of a first slot, and in FIG. 14-(b), a DMRS is transmitted in the first symbol of the second slot. According to the proposed method of transmitting a reference signal, in a situation in which the channel state does not change a lot in the time domain, a robust channel estimation performance can be obtained.

In FIGS. 14-(c) and 14-(d), the SRS is transmitted in the first symbol of a first slot. That is, the SRS is transmitted in the first symbol of the backhaul subframe. In the case in which an SRS is used for channel-dependent scheduling, the time for a base station to process the SRS can be considered, and the result of the processing can be applied to the next backhaul subframe. So it is preferable that the SRS is transmitted in the first symbol of the backhaul subframe. In this case, in consideration that only an OFDM symbol transmits the SRS is transmitted in the UL backhaul subframe, the base station does not need to wait the SRS transmitted for one subframe. So it gains in the time latency aspect. In FIG. 14-(c), a DMRS is transmitted in the sixth symbol of a first slot, and in FIG. 14-(d), a DMRS is transmitted in the first symbol of a second slot. According to the proposed method of transmitting a reference signal, in a situation in which the channel state has been stabilized, a robust channel estimation result can be obtained.

Figure 15:
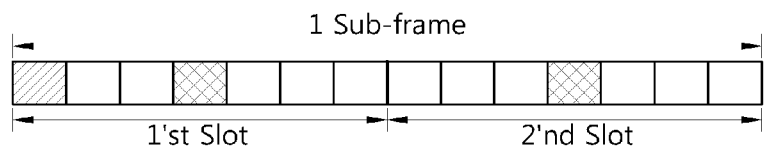
FIG. 15 shows an example of a backhaul subframe structure when a guard time is placed at the first of the backhaul subframe in the normal CP.

FIG. 15 shows an example of a backhaul subframe structure when a guard time is placed at the first of the backhaul subframe in the normal CP. In the case of the normal CP, one slot includes seven symbols. The guard time is allocated to the first symbol of a first slot. Accordingly, in the case in which the guard time is excluded, the first slot includes six symbols, and a second slot includes seven symbols. A DMRS is transmitted in the fourth symbol of the first slot and in the fourth symbol of the second slot.

Figure 16:
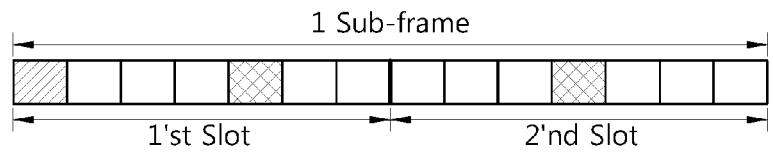
FIG. 16 shows an example of a backhaul subframe structure according to a proposed method of transmitting a reference signal when the guard time is placed at the first of the backhaul subframe in the normal CP.

FIG. 16 shows an example of a backhaul subframe structure according to a proposed method of transmitting a reference signal when the guard time is placed at the first of the backhaul subframe in the normal CP.

Referring to FIG. 16, in the backhaul subframe structure of FIG. 15, the DMRS of the first slot is delayed by one symbol and then transmitted. That is, the DMRS is transmitted in the fifth symbol of the first slot. Accordingly, in the case in which a symbol allocated to the guard time is excluded, the positions in which the DMRSs are transmitted are symmetrical to each other within the backhaul subframe.

Figure 17:
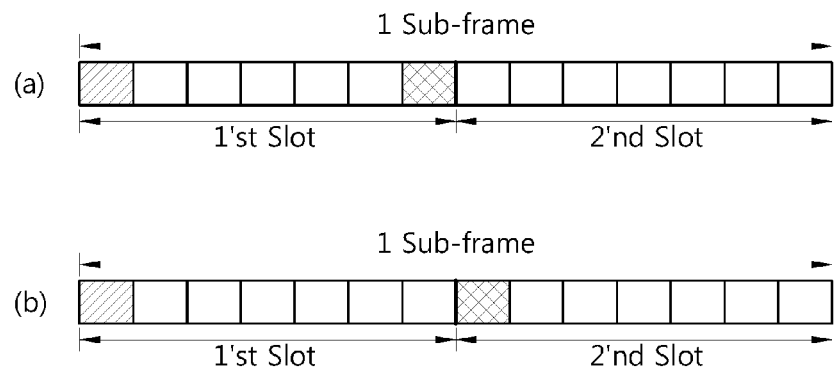
FIGS. 17 and 18 show another example of backhaul subframe structures according to a proposed method of transmitting a reference signal when the guard time is placed at the first of the backhaul subframe in the normal CP.
Figure 18:
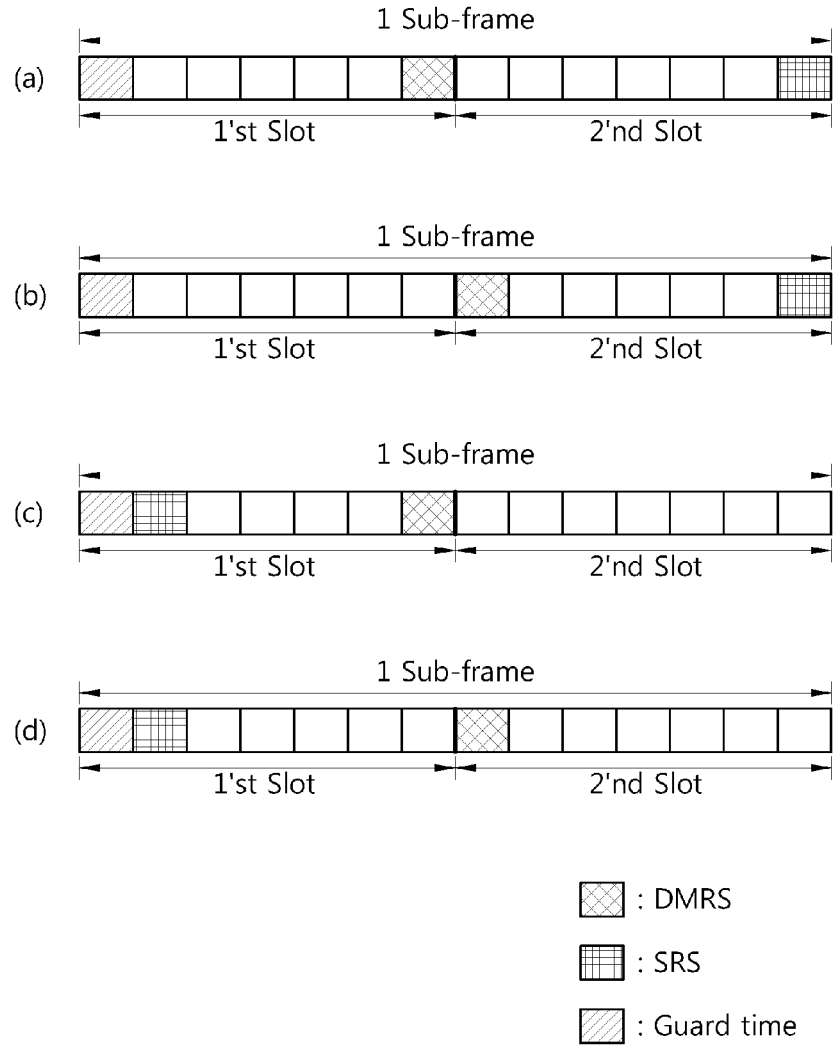

FIGS. 17 and 18 show another example of backhaul subframe structures according to a proposed method of transmitting a reference signal when the guard time is placed at the first of the backhaul subframe in the normal CP. This shows the case of non-slot frequency hopping.

FIG. 17 shows the case in which an SRS is not transmitted. In FIG. 17-(a), a DMRS is transmitted in the seventh symbol of a first slot. In FIG. 17-(b), a DMRS is transmitted in the first symbol of a second slot. That is, according to the proposed method of transmitting a reference signal, the DMRS can be transmitted in a symbol placed in the middle of the backhaul subframe. According to the proposed method of transmitting a reference signal, in a situation in which the channel state does not change a lot in the time domain, a robust channel estimation performance can be obtained.

FIG. 18 shows the case in which an SRS is additionally transmitted.

In FIGS. 18-(*a*) and 18-(*b*), the SRS is transmitted in the seventh symbol of a second slot. That is, in the case in which the guard time is excluded, the SRS is transmitted in the last symbol of the backhaul subframe. In this case, the SRS can reflect the most recent channel. In FIG. 18-(*a*), a DMRS is transmitted in the seventh symbol of a first slot, and in FIG. 18-(*b*), a DMRS is transmitted in the first symbol of the second slot. According to the proposed method of transmitting a reference signal, in a situation in which the channel state does not change a lot in the time domain, a robust channel estimation performance can be obtained.

In FIGS. 18-(*c*) and 18-(*d*), the SRS is transmitted in the first symbol of a first slot. That is, the SRS is transmitted in the first symbol of the backhaul subframe. In the case in which an SRS is used for channel-dependent scheduling, the time for a base station to process the SRS can be considered, and the result of the processing can be applied to the next backhaul subframe. So it is preferable that the SRS is transmitted in the first symbol of the backhaul subframe. In this case, in consideration that only an OFDM symbol transmits the SRS is transmitted in the UL backhaul subframe, the base station does not need to wait the SRS transmitted for one subframe. So it gains in the time latency aspect. In FIG. 18-(*c*), a DMRS is transmitted in the sixth symbol of a first slot, and in FIG. 18-(*d*), a DMRS is transmitted in the first symbol of a second slot.

FIGS. 19 to 22 show embodiment in extended CPs corresponding to the embodiments in the normal CPs of FIGS. 15 to 18. In the case of the extended CP, one slot includes six symbols. The guard time is allocated to the first symbol of a first slot. Accordingly, in the case in which the guard time is excluded, the first slot includes five symbols, and a second slot includes six symbols.

Figure 19:
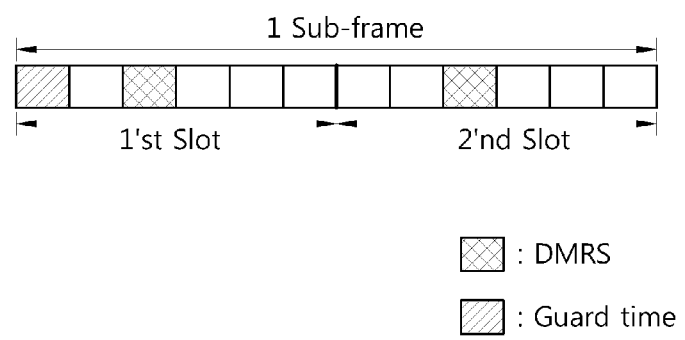
FIGS. 19 to 22 show embodiment in extended CPs corresponding to the embodiments in the normal CPs of FIGS. 15 to 18.
Figure 20:
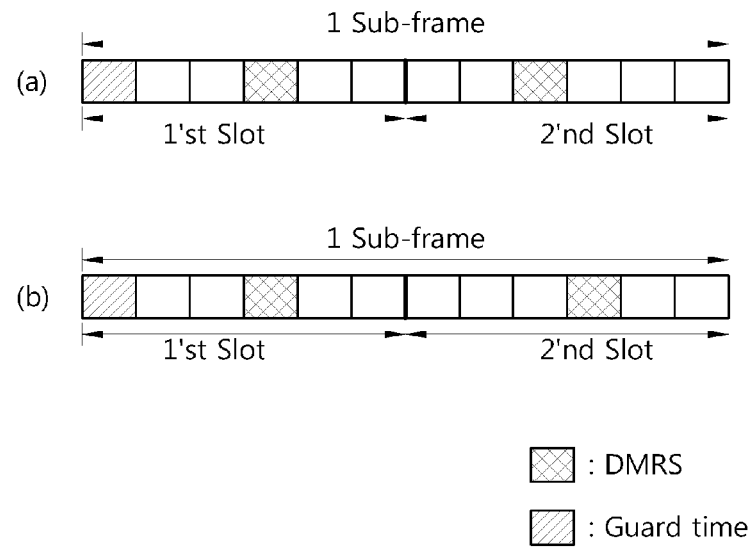

In FIG. 19, a DMRS is transmitted in the second symbol of the first slot and in the third symbol of the second slot. Referring to FIG. 20-(*a*), in the backhaul subframe structure of FIG. 19, the DMRS of the first slot is delayed by one symbol and then transmitted. Accordingly, the DMRS is transmitted in the third symbol of the first slot and in the third symbol of a second slot. Referring to FIG. 20-(*b*), in the backhaul subframe structure of FIG. 20-(*a*), the DMRS of the second slot is delayed by one symbol and then transmitted. Accordingly, the DMRS is transmitted in the third symbol of a first slot and in the fourth symbol of the second slot. If the DMRS is delayed by 1 OFDM symbol and transmitted in each slot as in the example of FIG. 20-(*b*), in the case in which interpolation between reference signals allocated to respective slots within a subframe is applied, the performance of channel estimation can be improved.

Figure 21:
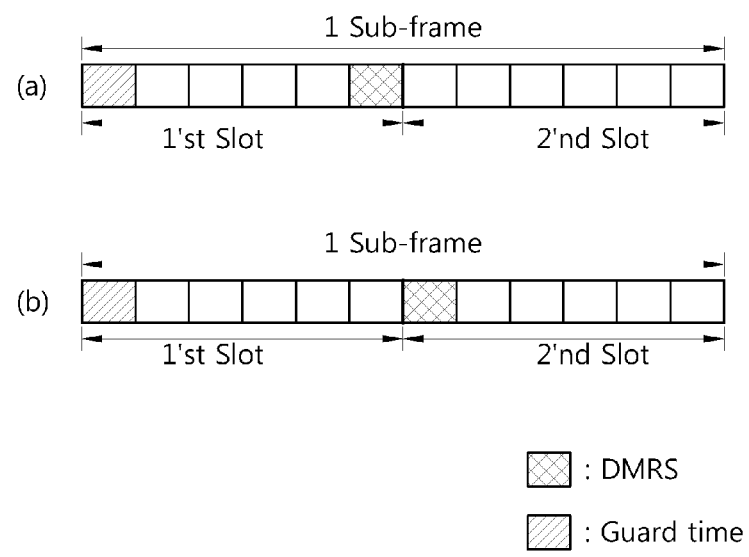
Figure 22:
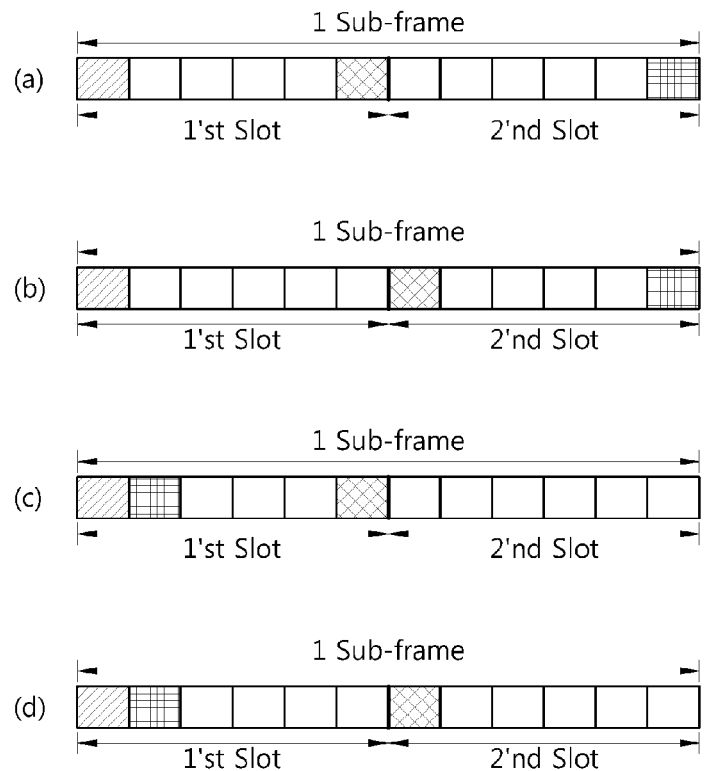

FIGS. 21 and 22 show the cases of non-slot hopping. In FIGS. 21 and 22, a DMRS is transmitted respectively in the fifth symbol of a first slot and in the first symbol of a second slot. An SRS may not be transmitted or may be transmitted in the first symbol of the first slot or the sixth symbol of the second slot.

Figure 23:
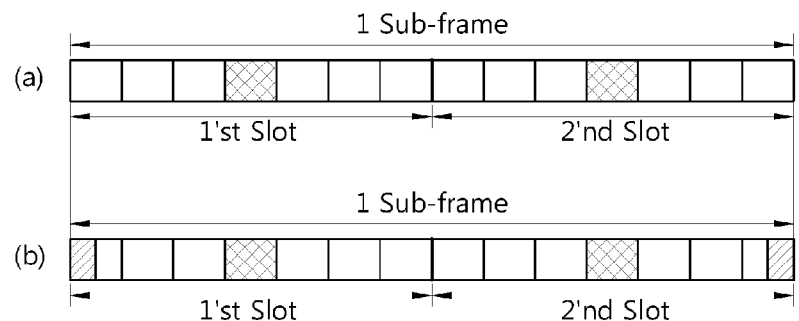
FIG. 23 shows an example of a backhaul subframe structure when a guard time is divided and placed at the first and end of the backhaul subframe in the normal CP.

FIG. 23 shows an example of a backhaul subframe structure when a guard time is divided and placed at the first and end of the backhaul subframe in the normal CP. In the case of the normal CP, one slot includes seven symbols. FIG. 23-(*a*) shows an UL subframe transmitted by a user equipment. The guard time is not allocated, and a DMRS is transmitted in the fourth symbol of a each slot respectively. In FIG. 23-(*b*), the guard time is allocated to the first ½ symbol of a first slot and the last ½ symbol of a second slot. The ½ symbol subsequent to the guard time of the first slot can be used for transmission of a data, a control signal, or a reference signal of the backhaul link. In case of using the backhaul subframe, a symbol timing of the backhaul subframe is the same as that of the UL subframe transmitted by a user equipment. In this case, the symbol timing does not mismatch the UL subframe transmitted by the user equipment. But, in the case in which the backhaul subframe is shifted by ½ symbol regarding to the UL subframe transmitted by a user equipment, a symbol timing mismatches the UL subframe, etc. of a base station.

Figure 24:
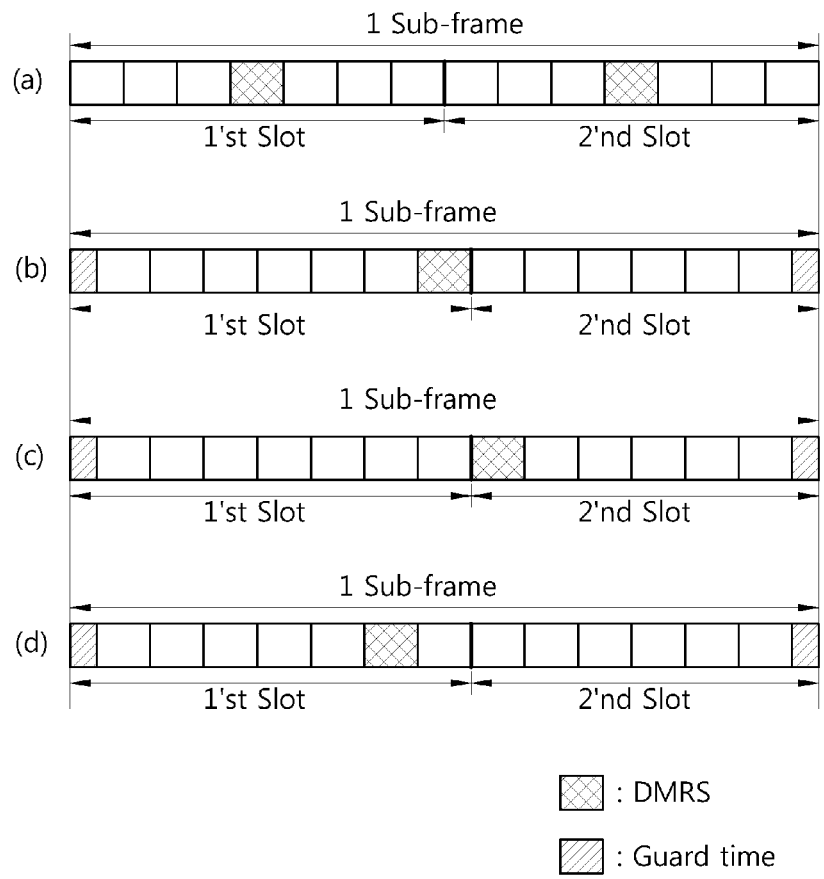
FIGS. 24 and 25 show examples of backhaul subframe structures according to a proposed method of transmitting a reference signal when the guard time is divided and placed at the first and end of the backhaul subframe in the normal CP.
Figure 25:
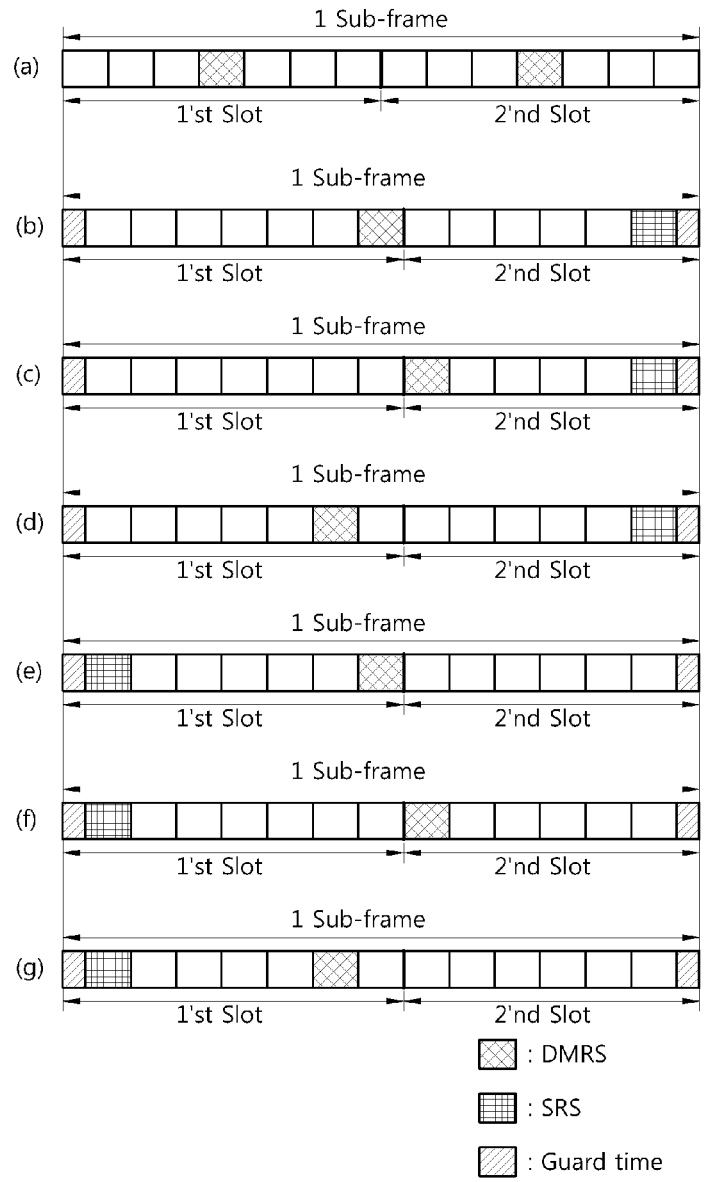

FIGS. 24 and 25 show examples of backhaul subframe structures according to a proposed method of transmitting a reference signal when the guard time is divided and placed at the first and end of the backhaul subframe in the normal CP. The guard time is allocated to the first ½ symbol of a first slot and the last ½ symbol of a second slot. The backhaul subframe is shifted by ½ symbol with reference to the UL subframe in FIG. 23-(*a*). The figures show the cases which can be applied to non-slot frequency hopping. A first slot includes seven symbols and a second slot includes six symbols.

FIG. 24 shows the case in which an SRS is not transmitted. In FIG. 24-(*b*), a DMRS is transmitted in the seventh symbol of a first slot. In FIG. 24-(*c*), a DMRS is transmitted in the first symbol of a second slot. In FIG. 24-(*d*), a DMRS is transmitted in the sixth symbol of a first slot. According to the proposed method of transmitting a reference signal, in a situation in which the channel state does not change a lot in the time domain, a robust (robust) channel estimation performance can be obtained.

FIG. 25 shows the case in which an SRS is additionally transmitted. In the backhaul subframe structure of FIG. 24, the SRS can be additionally transmitted in the sixth symbol of a second slot or in the first symbol of the first slot.

Figure 26:
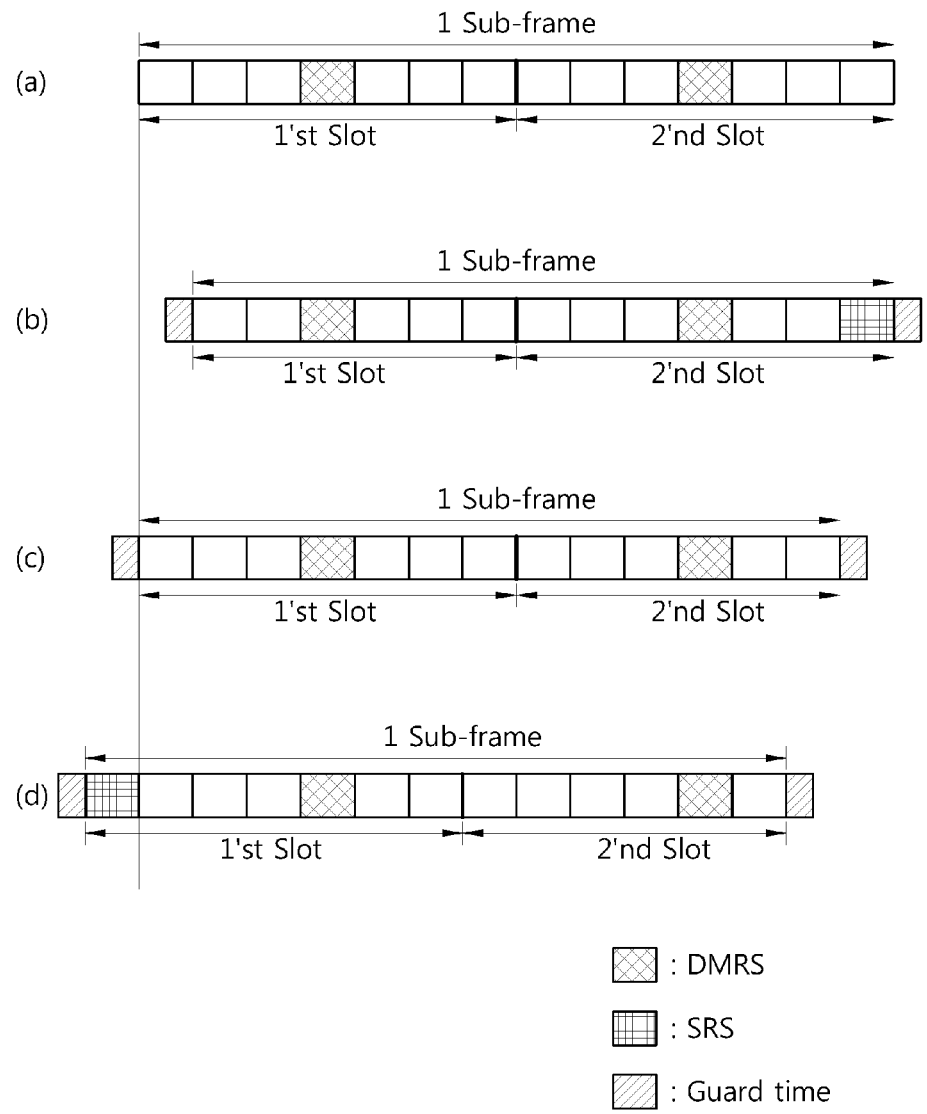
FIG. 26 shows another example of a backhaul subframe structure according to a proposed method of transmitting a reference signal when the guard time is divided and placed at the first and end of the backhaul subframe in the normal CP.

FIG. 26 shows another example of a backhaul subframe structure according to a proposed method of transmitting a reference signal when the guard time is divided and placed at the first and end of the backhaul subframe in the normal CP.

FIG. 26-(*a*) shows an example of the structure of a UL subframe transmitted to a base station by a user equipment. The UL subframe is referred as a base station subframe. The base station subframe indicates an uplink subframe in a base station, corresponding to a backhaul subframe. In FIG. 26-(*b*), the backhaul subframe is delayed by a ½ symbol on the basis of a base station subframe and then transmitted. The backhaul subframe can be delayed by a ½ symbol with consideration taken of propagation delay from a relay station to a base station such that a symbol timing is synchronized with the base station subframe. If the guard time is allocated, a first slot includes six symbols, and a second slot includes seven symbols. To match the timings when DMRSs are transmitted in a relay station and a base station, in the backhaul subframe, the DMRS is transmitted in the third symbol of a first slot and the fourth symbol of a second slot. An SRS is transmitted in the seventh symbol of the second slot. In FIG. 26-(*c*), the backhaul subframe is advanced by a ½ symbol on the basis of the base station subframe and then transmitted. If the guard time is allocated, a first slot includes seven symbols, and a second slot includes six symbols. To match timings when DMRSs are transmitted in a relay station and a base station, in the backhaul subframe, the DMRS is transmitted in the fourth symbol of the first slot and in the fourth symbol of the second slot. In FIG. 26-(*d*), the backhaul subframe is advanced by a 1½ symbol on the basis of the base station subframe and then transmitted. If the guard time is allocated, a first slot includes seven symbols, and a second slot includes six symbols. To match timings when DMRSs are transmitted in a relay station and a base station, in the backhaul subframe, the DMRS is transmitted in the fifth symbol of the first slot and in the fifth symbol of the second slot. An SRS is transmitted in the first OFDM symbol of the first slot. It is deviated from the boundary of the base station subframe. In the FIG. 26-(b), the SRS located in the last symbol of the backhaul subframe can be multiplexed in the same symbol with an SRS located in the last symbol of the UL subframe transmitted by a user equipment. Likewise, in the FIG. 26-(d), the SRS located in the first symbol of the backhaul subframe can be multiplexed in the same symbol with an SRS located in the last symbol of the UL subframe transmitted by a user equipment.

Figure 27:
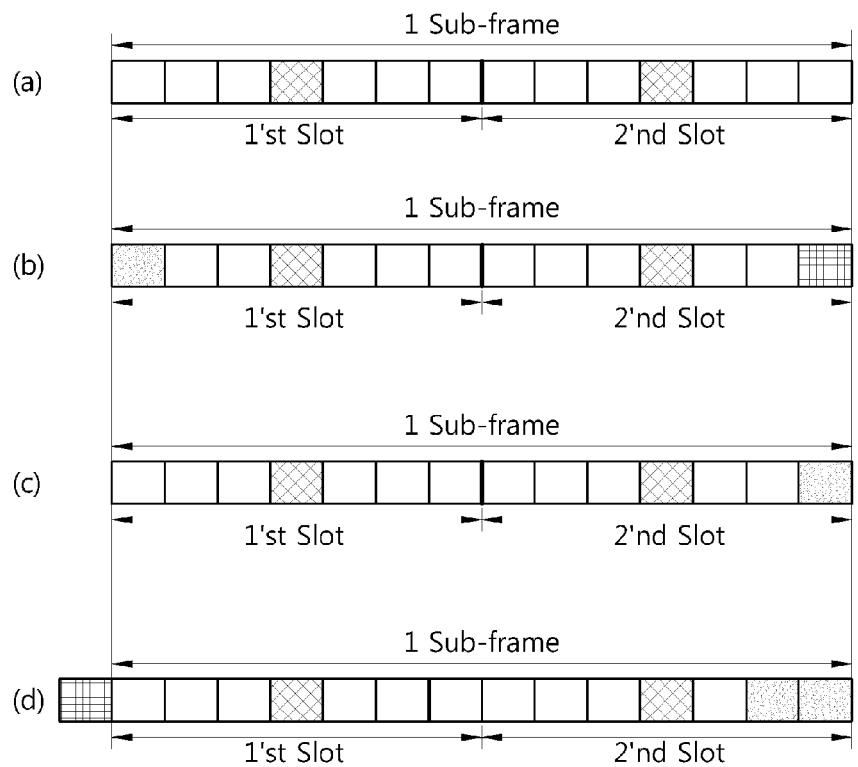
FIG. 27 shows the backhaul subframe structure of FIG. 26 from a viewpoint of a base station.
Figure 28:
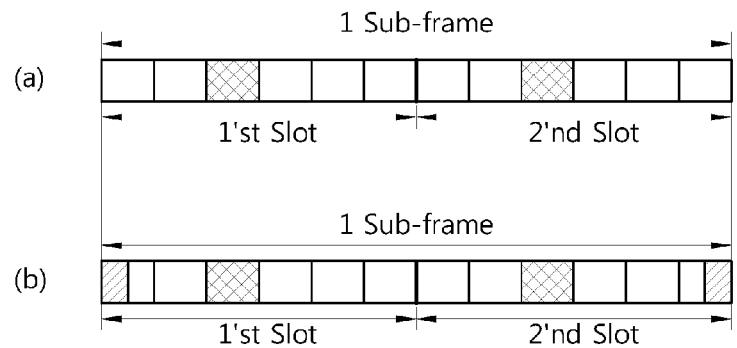
FIGS. 28 to 32 show embodiment in extended CPs corresponding to the embodiments in the normal CPs of FIGS. 23 to 27.

FIG. 27 shows the backhaul subframe structure of FIG. 26 from a viewpoint of a base station.

FIG. 27-(b) corresponds to FIG. 26-(b). The first symbol of a first slot becomes an idle symbol from a viewpoint of a base station because it is a symbol corresponding to the guard time from a viewpoint of a relay station. A DMRS is received in the fourth symbol of the first slot and the fourth symbol of a second slot, and an SRS is received in the seventh symbol of the second slot. FIG. 27-(c) corresponds to FIG. 26-(c). The seventh symbol of a second slot becomes an idle symbol from a viewpoint of a base station because it is a symbol corresponding to the guard time from a viewpoint of a relay station. A DMRS is received in the fourth symbol of a first slot and in the fourth symbol of the second slot. FIG. 27-(d) corresponds to FIG. 26-(d). The sixth symbol of a second slot is a symbol corresponding to the guard time from a viewpoint of a relay station, and the seventh symbol of the second slot is a symbol outside the boundary of the backhaul subframe from a viewpoint of the relay station. Accordingly, the sixth and seventh symbols of the second slot become idle symbols from a viewpoint of a base station. A DMRS is received in the fifth symbol of a first slot and in the fifth symbol of the second slot, and an SRS is received in the first symbol of the first slot.

FIGS. 28 to 32 show embodiment in extended CPs corresponding to the embodiments in the normal CPs of FIGS. 23 to 27. In the case of the extended CP, one slot includes six symbols. Referring to the FIG. 28, the guard time is allocated to the first ½ symbol of a first slot and the last ½ symbol of a second slot. The ½ symbol subsequent to the guard time of the first slot is used for transmission of a data, a control signal, or a reference signal of the backhaul link. In case of using the backhaul subframe, a symbol timing of the backhaul subframe is the same as that of the UL subframe transmitted by a user equipment. In this case, the symbol timing does not mismatch the UL subframe transmitted by the user equipment. But, in the case in which the backhaul subframe is shifted by ½ symbol regarding to the UL subframe transmitted by a user equipment, a symbol timing mismatches the uplink subframe, etc. of a base station.

Figure 29:
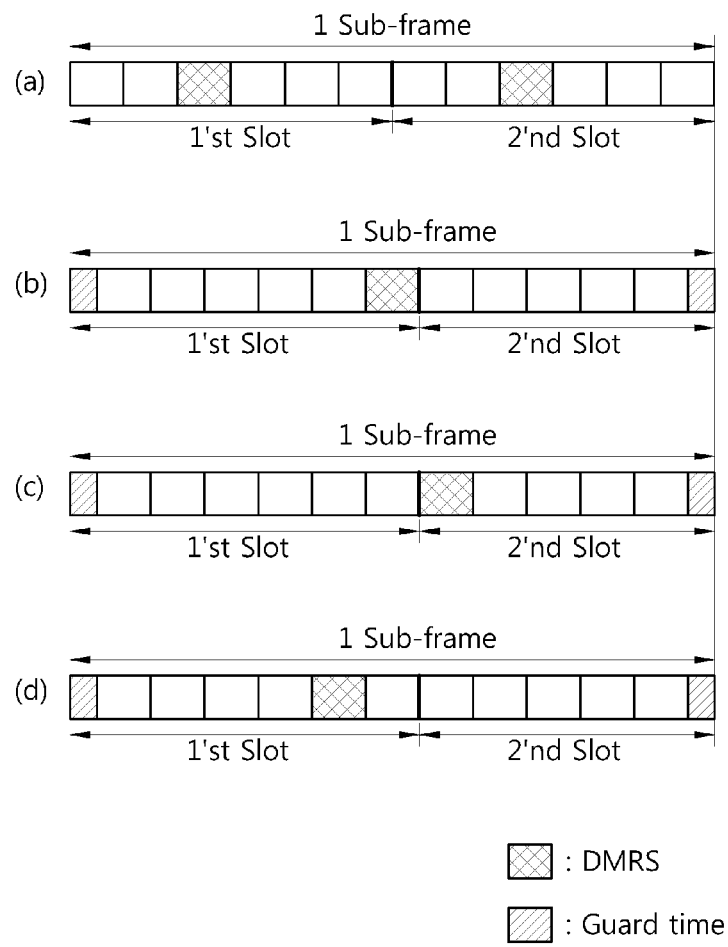
Figure 30:
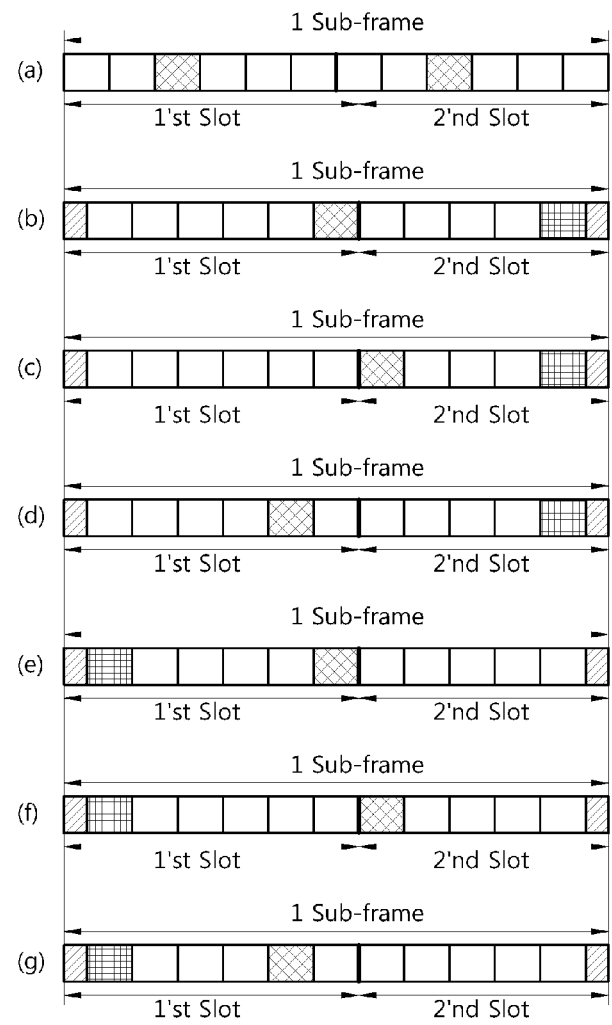

FIGS. 29 and 30 show the cases of non-slot hopping. A first slot includes six symbols, and a second slot includes five symbols. A DMRS can be transmitted respectively in the sixth symbol of the first slot, in the first symbol of the second slot, or in the fifth symbol of the first slot. Furthermore, an SRS may not be transmitted or can be transmitted in the fifth symbol of the second slot or in the first symbol of the first slot.

Figure 31:
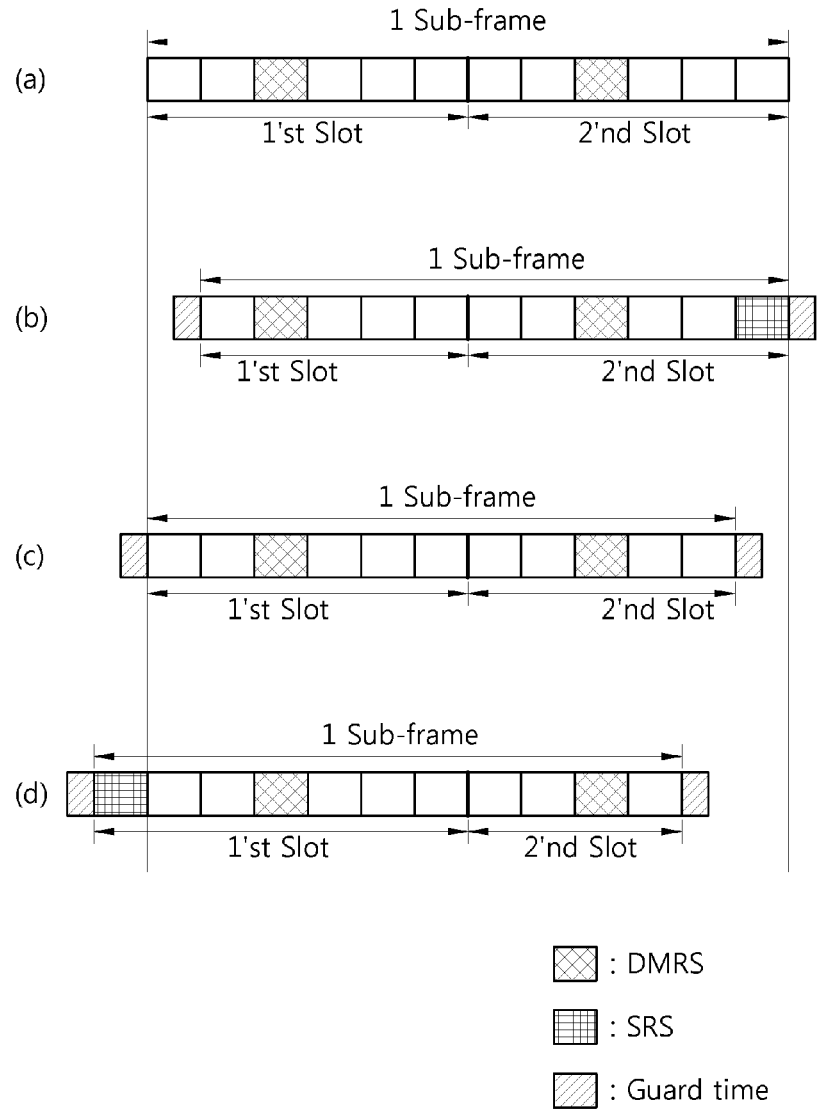

In FIG. 31, the backhaul subframe is delayed or advanced on the basis of a base station subframe and then transmitted. In FIG. 31-(b), the backhaul subframe is delayed by a ½ symbol on the basis of the base station subframe and then transmitted. In FIG. 31-(c), the backhaul subframe is advanced by a ½ symbol on the basis of the base station subframe and then transmitted. In FIG. 31-(d), the backhaul subframe is advanced by a 1½ symbol on the basis of the base station subframe and then transmitted. In the FIG. 31-(b), the SRS located in the last symbol of the backhaul subframe can be multiplexed in the same symbol with an SRS located in the last symbol of the UL subframe transmitted by a user equipment. Likewise, in the FIG. 31-(d), the SRS located in the first symbol of the backhaul subframe can be multiplexed in the same symbol with an SRS located in the last symbol of the UL subframe transmitted by a user equipment.

Figure 32:
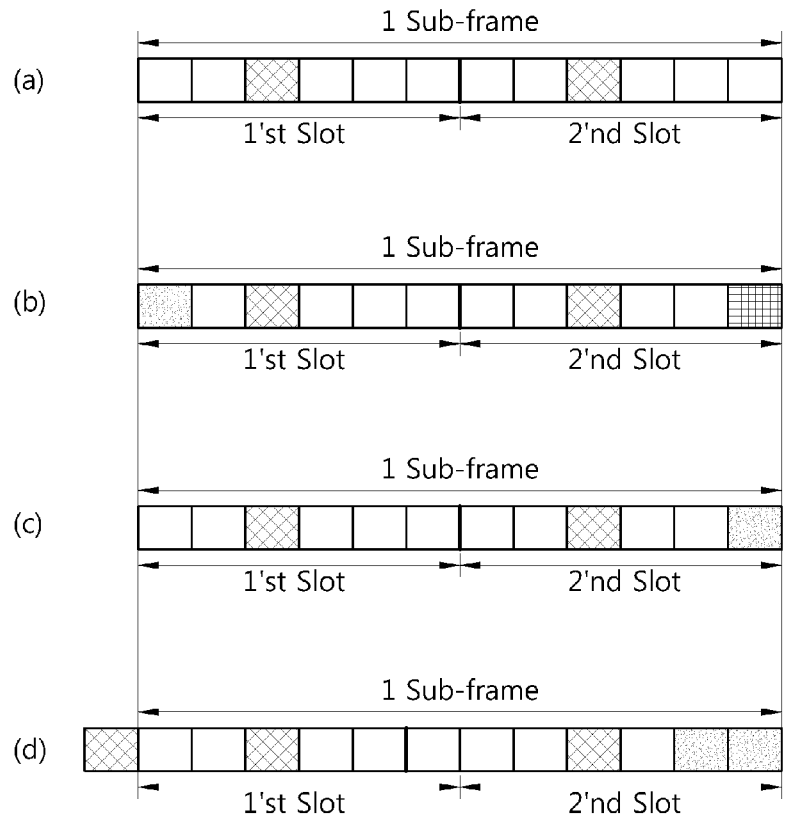

FIG. 32 shows the structure of the backhaul subframe shown in FIG. 31 from a viewpoint of a base station. FIG. 32-(b) corresponds to FIG. 31-(b). The first symbol of a first slot becomes an idle symbol from a viewpoint of a base station because it is a symbol corresponding to the guard time from a viewpoint of a relay station. A DMRS is received in the third symbol of the first slot and the third symbol of a second slot, and an SRS is received in the sixth symbol of the second slot. FIG. 32-(c) corresponds to FIG. 31-(c). The sixth symbol of a second slot becomes an idle symbol from a viewpoint of a base station because it is a symbol corresponding to the guard time from a viewpoint of a relay station. A DMRS is received in the third symbol of a first slot and in the third symbol of the second slot. FIG. 32-(d) corresponds to FIG. 31-(d). The sixth symbol of a second slot is a symbol corresponding to the guard time from a viewpoint of a relay station, and the seventh symbol of the second slot is a symbol outside the boundary of the backhaul subframe from a viewpoint of the relay station. Accordingly, the sixth and seventh symbols of the second slot become idle symbols from a viewpoint of a base station. A DMRS is received in the fourth symbol of a first slot and in the fourth symbol of the second slot, and an SRS is received in the first symbol of the first slot.

Hereinafter, a proposed method of transmitting a reference signal when two OFDM symbols are allocated to the guard time is described.

Figure 33:
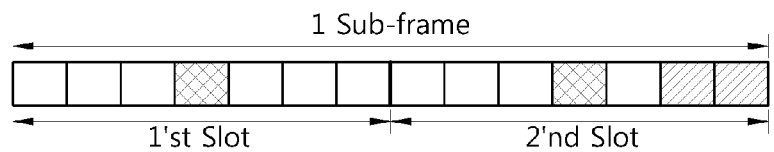
FIG. 33 shows an example of a backhaul subframe structure when a guard time is placed at the end of the backhaul subframe in the normal CP.

FIG. 33 shows an example of a backhaul subframe structure when a guard time is placed at the end of the backhaul subframe in the normal CP. In the case of the normal CP, one slot includes seven symbols. A guard time is allocated to the sixth and seventh symbols of a second slot. Accordingly, in the case in which the guard time is excluded, a first slot includes seven symbols, and the second slot includes five symbols. A DMRS is transmitted in the fourth symbol of each of the two slots.

Figure 34:
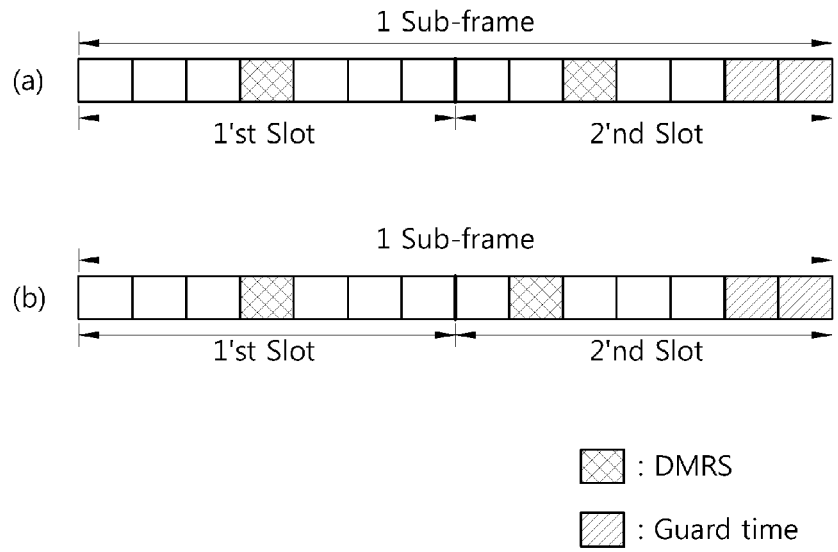
FIG. 34 shows an example of a backhaul subframe structure according to a proposed method of transmitting a reference signal when the guard time is placed at the end of the backhaul subframe in the normal CP.

FIG. 34 shows an example of a backhaul subframe structure according to a proposed method of transmitting a reference signal when the guard time is placed at the end of the backhaul subframe in the normal CP.

Referring to FIG. 34-(a), in the backhaul subframe structure of FIG. 33, the DMRS of the second slot is advanced by one symbol and then transmitted. That is, the DMRS is transmitted in the third symbol of the second slot. Referring to FIG. 34-(b), in the backhaul subframe structure of FIG. 34-(a), the DMRS of the second slot is advanced by one symbol and then transmitted. That is, the DMRS is transmitted in the second symbol of the second slot. Accordingly, since spacing between resources in which the reference signals are transmitted in the time domain is narrowed, the performance of channel estimation can be improved in an environment in which the channel state is rapidly changed. Furthermore, since the resources allocated to the reference signals differ, there may exist an influence caused by CDM of a symbol to which data are allocated in a non-relay subframe and a symbol to which the reference signal is allocated in a relay subframe.

Figure 35:
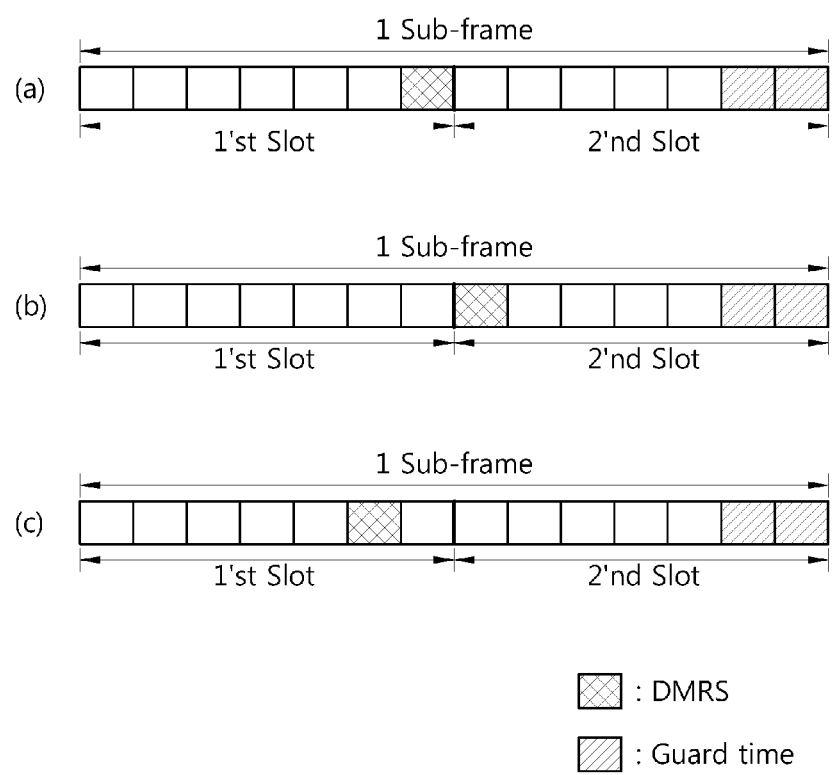
FIGS. 35 to 37 show another example of backhaul subframe structures according to a proposed method of transmitting a reference signal when the guard time is placed at the end of the backhaul subframe in the normal CP.
Figure 36:
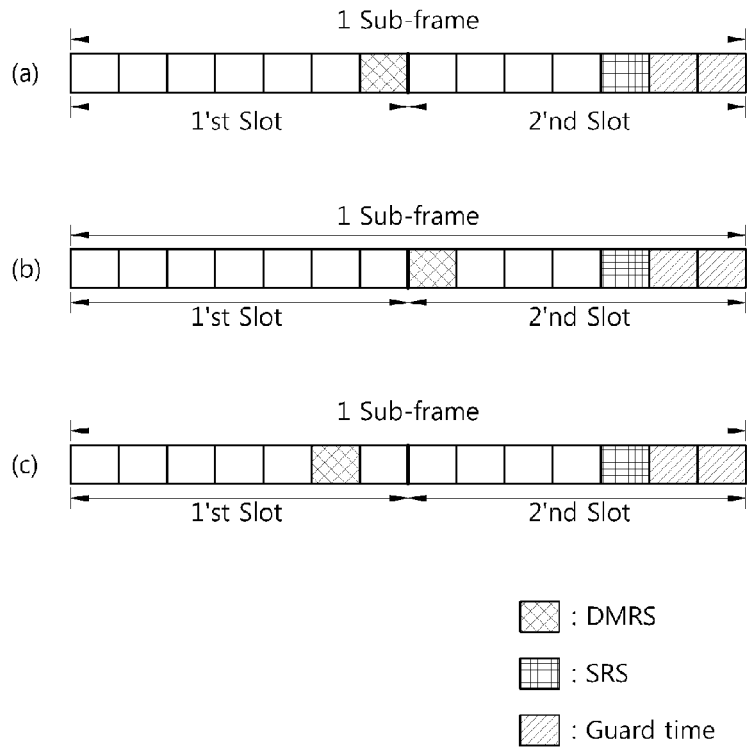
Figure 37:
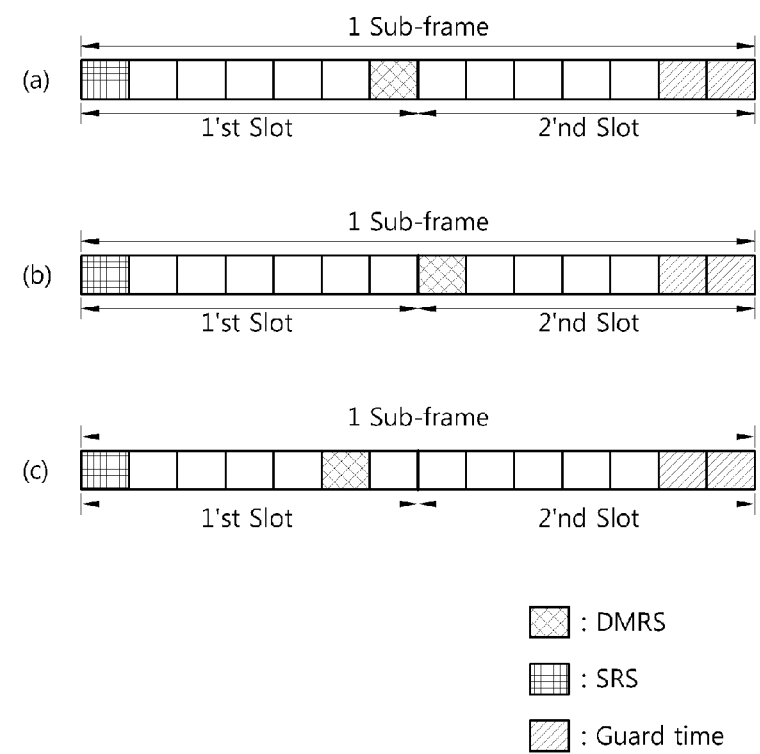
Figure 38:
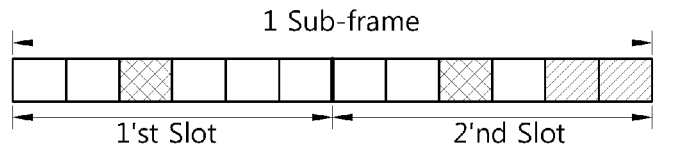
FIGS. 38 to 42 show embodiment in extended CPs corresponding to the embodiments in the normal CPs of FIGS. 33 to 37.

FIGS. 35 to 37 show another example of backhaul subframe structures according to a proposed method of transmitting a reference signal when the guard time is placed at the end of the backhaul subframe in the normal CP. The figures show the cases of non-slot hopping.

FIG. 35 shows the case in which an SRS is not transmitted. In FIG. 35-(a), a DMRS is transmitted in the seventh symbol of a first slot. In FIG. 35-(b), a DMRS is transmitted in the first symbol of a second slot. In FIG. 35-(c), a DMRS is transmitted in the sixth symbol of a first slot. According to the proposed method of transmitting a reference signal, in a situation in which the channel state does not change a lot in the time domain, a robust channel estimation performance can be obtained.

FIGS. 36 and 37 show the cases in which an SRS is additionally transmitted. Like in FIG. 35, a DMRS can be transmitted in any one of the seventh symbol of a first slot, the first symbol of a second slot, and the sixth symbol of a first slot. An SRS can be transmitted in the fifth symbol of the second slot or the first symbol of the first slot.

Figure 39:
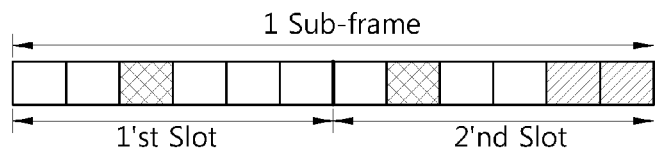
Figure 40:
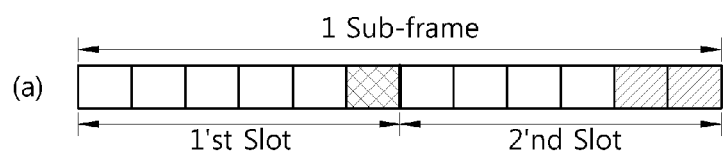
Figure 40:
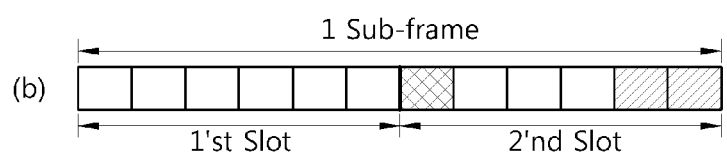
Figure 40:
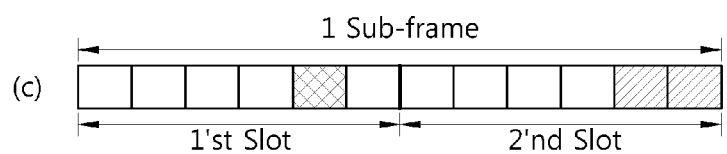
Figure 41:
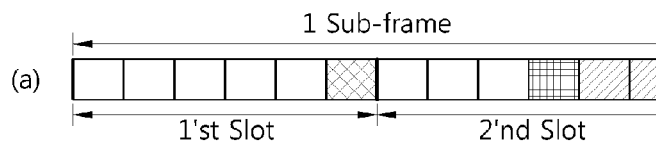
Figure 41:
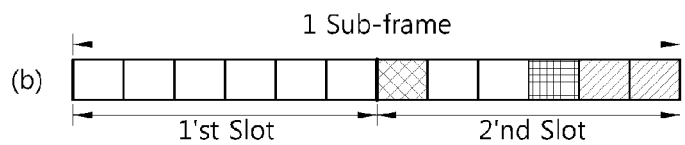
Figure 41:
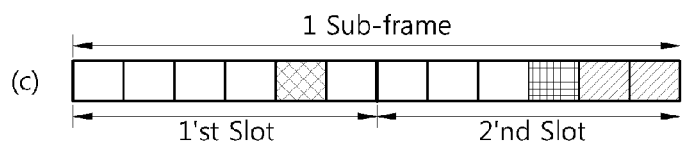
Figure 42:
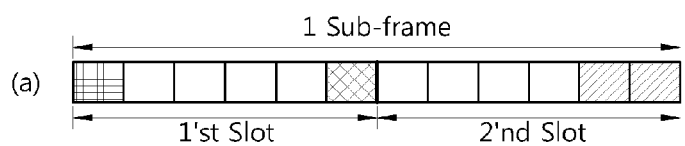
Figure 42:
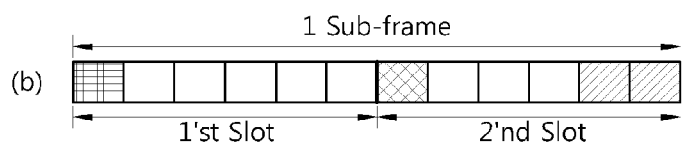
Figure 42:
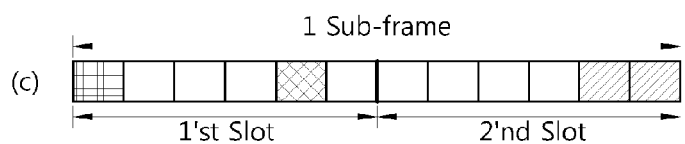

FIGS. 38 to 42 show embodiment in extended CPs corresponding to the embodiments in the normal CPs of FIGS. 33 to 37. In the case of the extended CP, one slot includes six symbols. A guard time is allocated to the fifth and sixth symbols of a second slot. Accordingly, in the case in which the guard time is excluded, a first slot includes six symbols, and the second slot includes 4 symbols. In FIG. 39, the DMRS of the second slot is advanced by one symbol and then transmitted. FIGS. 40 to 42 show the cases of non-slot hopping. A DMRS can be transmitted in any one of the sixth symbol of a first slot, the first symbol of a second slot, and the fifth symbol of a first slot. An SRS may not be transmitted or may be transmitted in the fourth symbol of the second slot or the first symbol of the first slot.

Figure 43:
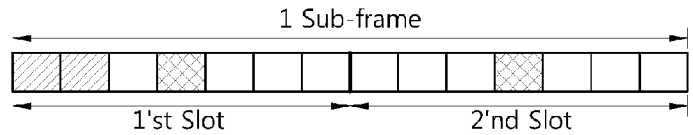
FIG. 43 shows an example of a backhaul subframe structure when a guard time is placed at the end of the backhaul subframe in the normal CP.

FIG. 43 shows an example of a backhaul subframe structure when a guard time is placed at the end of the backhaul subframe in the normal CP. In the case of the normal CP, one slot includes seven symbols. A guard time is allocated to the first and the second symbols of a first slot. Accordingly, in the case in which the guard time is excluded, the first slot includes five symbols, and a second slot includes seven symbols. A DMRS is transmitted in the second symbol of the first slot and in the fourth symbol of the second slot.

Figure 44:
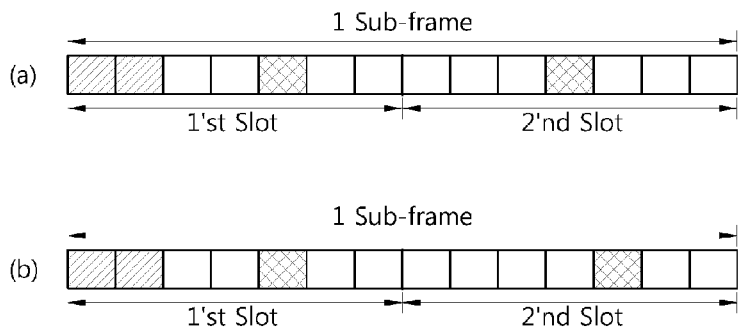
FIG. 44 shows an example of a backhaul subframe structure according to a proposed method of transmitting a reference signal when the guard time is placed at the first of the backhaul subframe in the normal CP.

FIG. 44 shows an example of a backhaul subframe structure according to a proposed method of transmitting a reference signal when the guard time is placed at the first of the backhaul subframe in the normal CP. Referring to FIG. 44-(a), in the backhaul subframe structure of FIG. 43, the DMRS of the first slot is delayed by one symbol and then transmitted. That is, in the first slot, the DMRS is transmitted in the third symbol. Referring to FIG. 44-(b), in the backhaul subframe structure of FIG. 44-(a), the DMRS of the second slot is delayed by one symbol and then transmitted. In other words, the DMRS is transmitted in the third symbol of the first slot and in the fifth symbol of the second slot.

Figure 45:
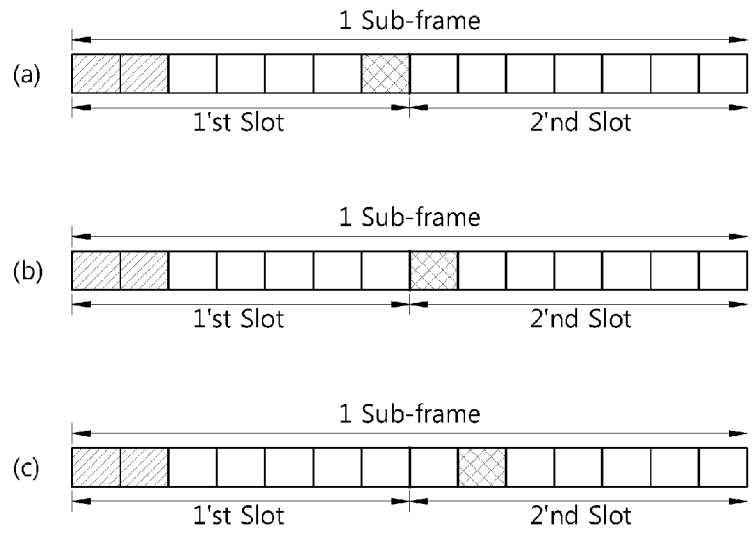
FIGS. 45 to 47 shows another example of backhaul subframe structures according to a proposed method of transmitting a reference signal when the guard time is placed at the first of the backhaul subframe in the normal CP.
Figure 46:
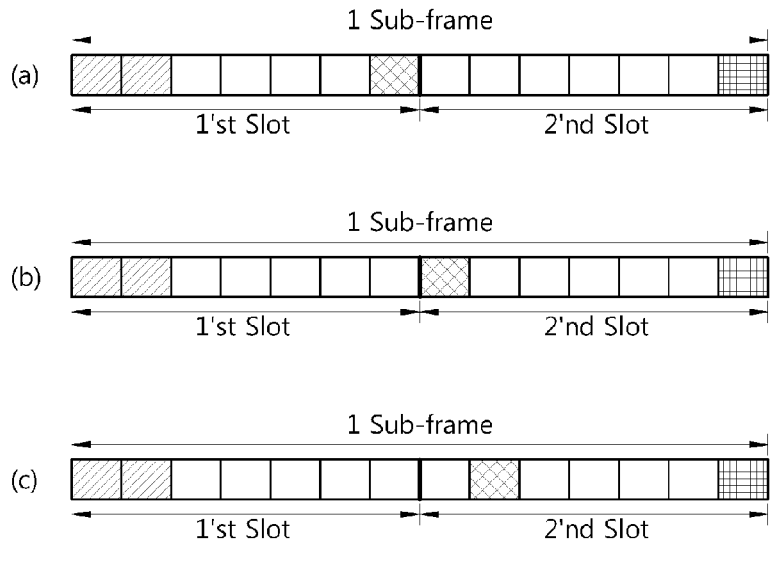
Figure 47:
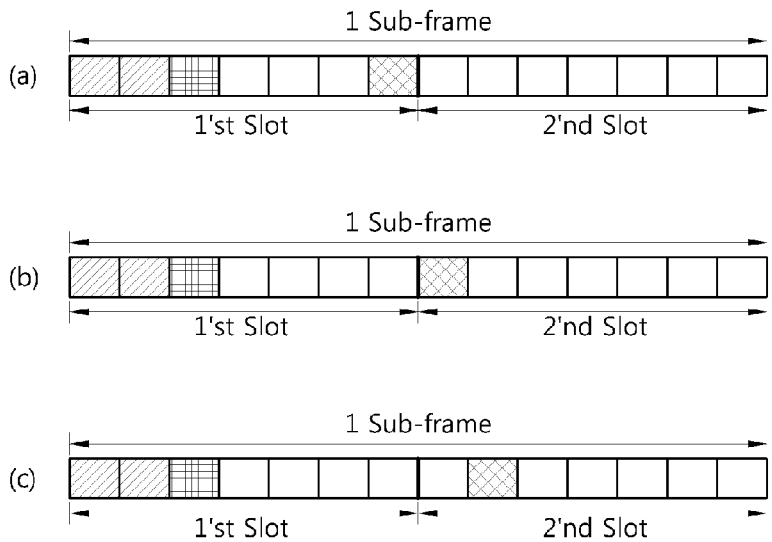
Figure 48:
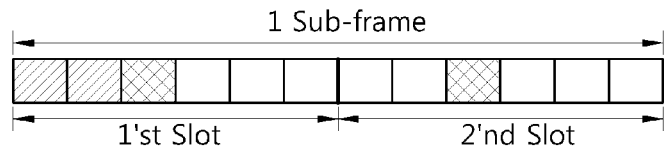
FIGS. 48 to 52 show embodiments in extended CPs corresponding to the embodiments in the normal CPs of FIGS. 43 to 47.

FIGS. 45 to 47 shows another example of backhaul subframe structures according to a proposed method of transmitting a reference signal when the guard time is placed at the first of the backhaul subframe in the normal CP. The figures show the cases of non-slot hopping.

FIG. 45 shows the case in which an SRS is not transmitted. In FIG. 45-(a), a DMRS is transmitted in the fifth symbol of a first slot. In FIG. 45-(b), a DMRS is transmitted in the first symbol of a second slot. In FIG. 45-(c), a DMRS is transmitted in the second symbol of a second slot. According to the proposed method of transmitting a reference signal, in a situation in which the channel state does not change a lot in the time domain, a robust channel estimation performance can be obtained.

FIGS. 46 and 47 show the cases in which an SRS is additionally transmitted. A DMRS can be transmitted in any one of the fifth symbol of a first slot, the first symbol of a second slot, and the second symbol of a second slot. An SRS can be transmitted in the seventh symbol of the second slot or in the first symbol of the first slot.

Figure 49:
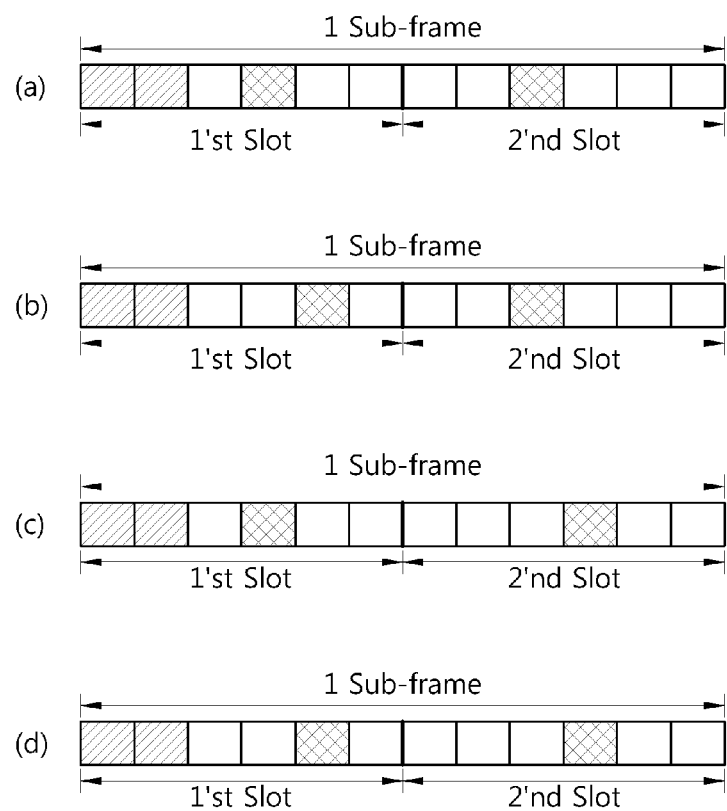
Figure 50:
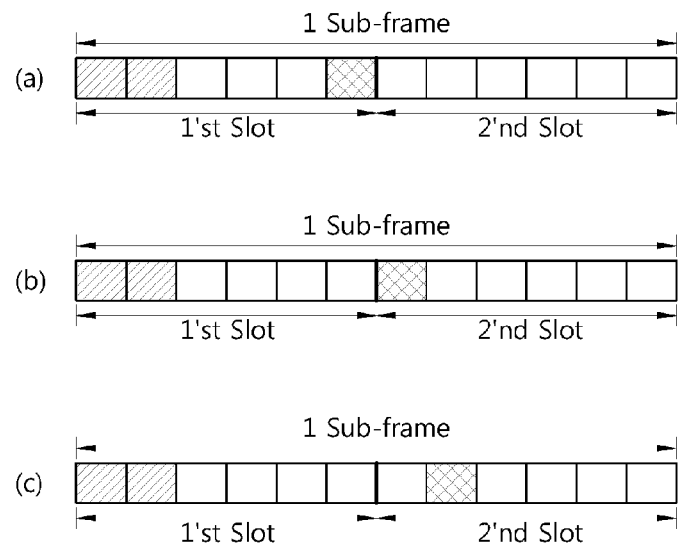
Figure 51:
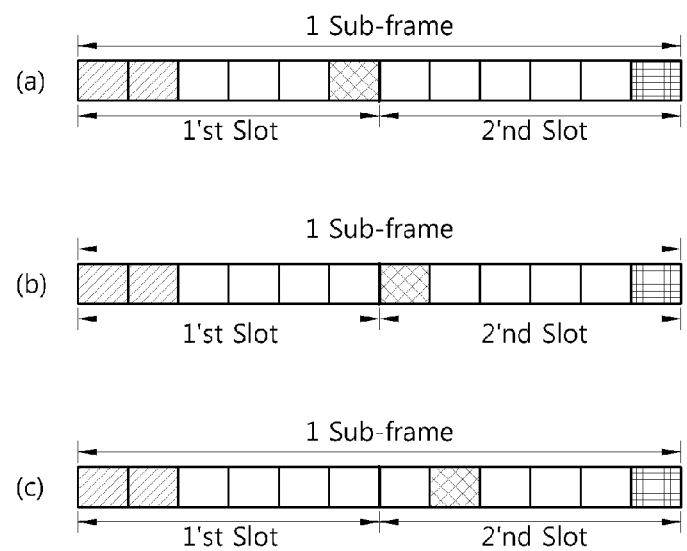
Figure 52:
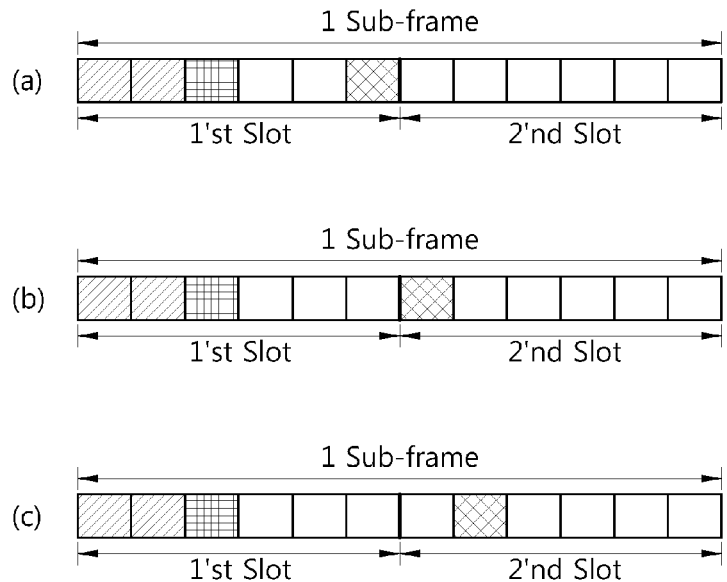

FIGS. 48 to 52 show embodiments in extended CPs corresponding to the embodiments in the normal CPs of FIGS. 43 to 47. In the case of the extended CP, one slot includes six symbols. A guard time is allocated to the first and the second symbols of a first slot. Accordingly, in the case in which the guard time is excluded, the first slot includes four symbols, and a second slot includes six symbols. Referring to FIG. 49, in the backhaul subframe structure of FIG. 48, the DMRS of the first slot can be delayed by one symbol and transmitted (FIG. 49-(a)) or can be delayed by two symbols and transmitted (FIG. 49-(b)). Alternatively, the DMRS of the second slot may be further delayed by one symbol and then transmitted (FIG. 49-(c), (d)). FIGS. 50 to 52 show the cases of non-slot hopping. A DMRS can be transmitted in any one of the fourth symbol of a first slot, the first symbol of a second slot, and the second symbol of a second slot. An SRS may not be transmitted or may be transmitted in the fourth symbol of the second slot or in the first symbol of the first slot.

Figure 53:
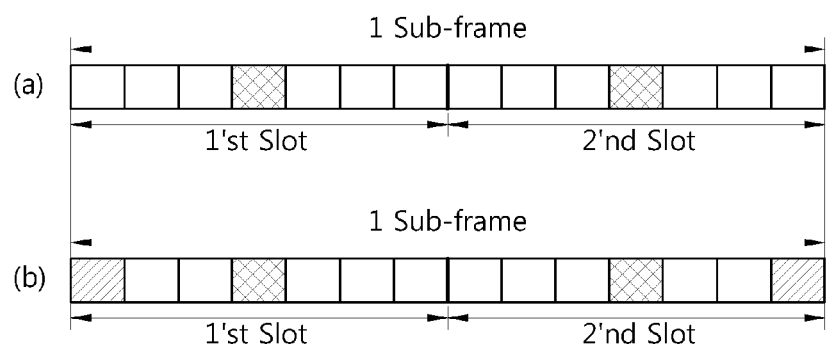
FIG. 53 shows an example of a backhaul subframe structure when a guard time is divided and placed at the first and end of the backhaul subframe in the normal CP.

FIG. 53 shows an example of a backhaul subframe structure when a guard time is divided and placed at the first and end of the backhaul subframe in the normal CP. In the case of the normal CP, one slot includes seven symbols. FIG. 53-(a) shows an UL subframe transmitted by a user equipment. The guard time is not allocated, and a DMRS is transmitted in the fourth symbol of a each slot respectively. In FIG. 53-(b), the guard time is allocated to the first symbol of a first slot and the seventh symbol of a second slot. Accordingly, in the case in which the guard time is excluded, each of the first slot and the second slot includes six symbols. A DMRS is transmitted in the third symbol of the first slot and the fourth symbol of the second slot.

Figure 54:
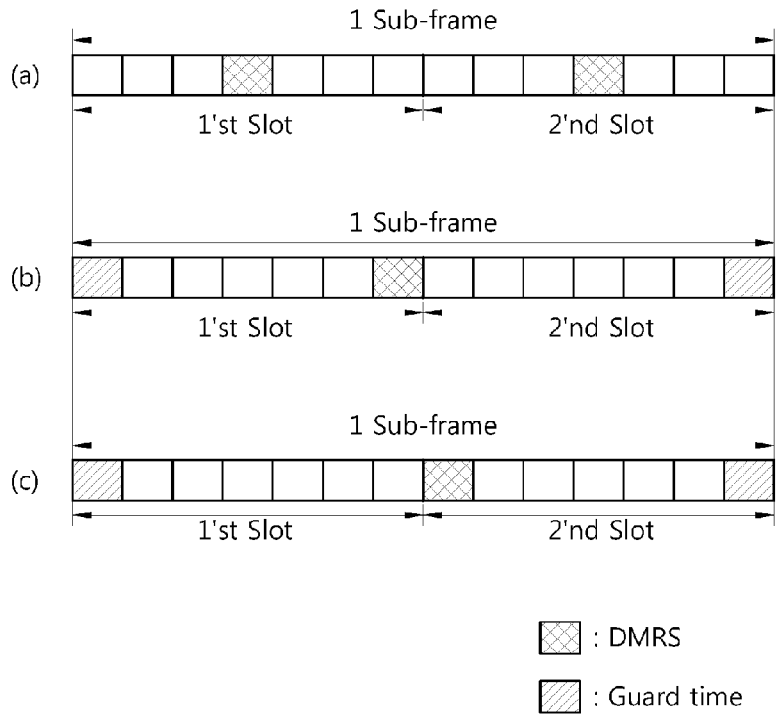
FIGS. 54 and 56 show examples of backhaul subframe structures according to a proposed method of transmitting a reference signal when the guard time is placed at the first of the backhaul subframe in the normal CP.
Figure 56:
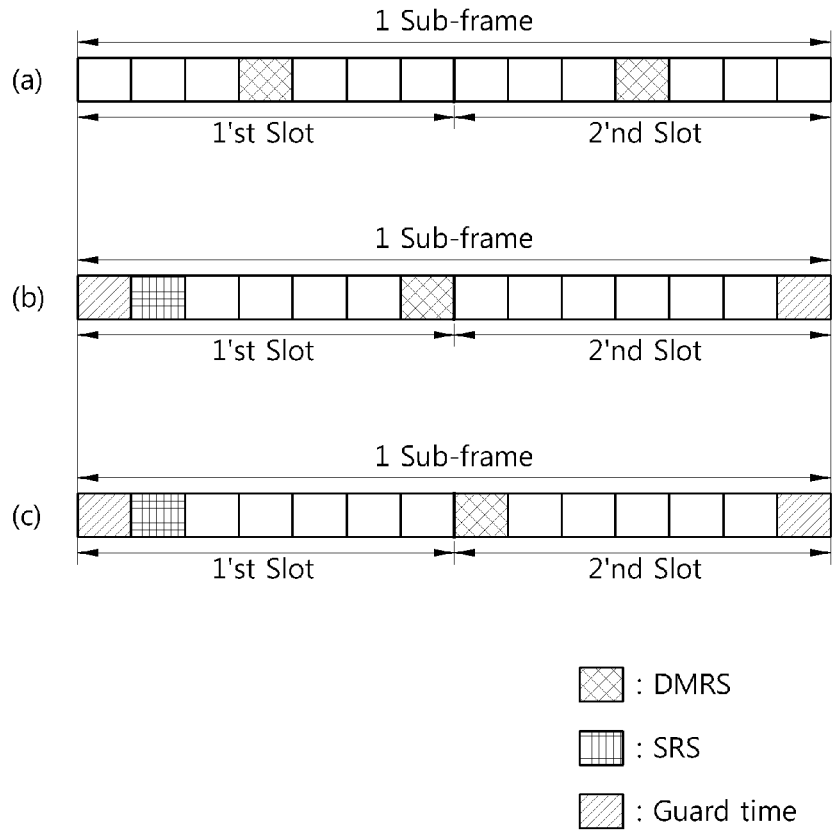
Figure 57:
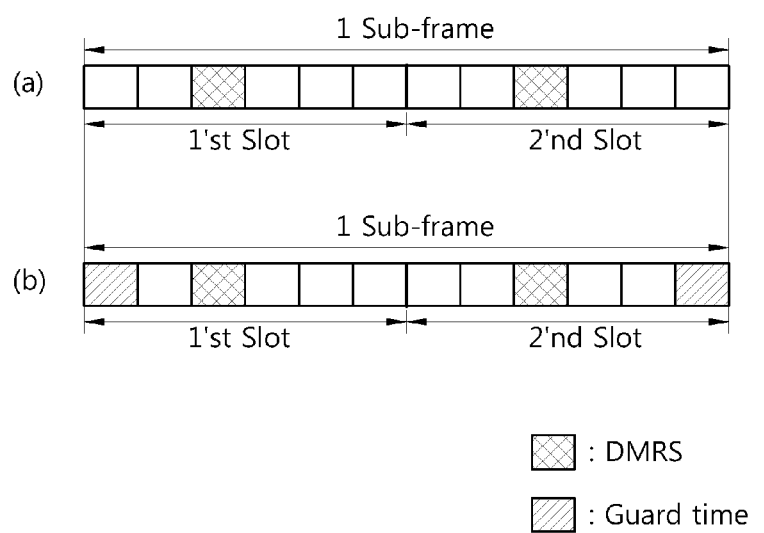
FIGS. 57 to 61 show embodiment in extended CPs corresponding to the embodiments in the normal CPs of FIGS. 43 to 47.

FIGS. 54 and 56 show examples of backhaul subframe structures according to a proposed method of transmitting a reference signal when the guard time is placed at the first of the backhaul subframe in the normal CP. The figures show the cases of non-slot hopping.

FIG. 54 shows the case in which an SRS is not transmitted. In FIG. 54-(b), a DMRS is transmitted in the sixth symbol of a first slot. In FIG. 54-(c), a DMRS is transmitted in the first symbol of a second slot. According to the proposed method of transmitting a reference signal, in a situation in which the channel state does not change a lot in the time domain, a robust channel estimation performance can be obtained.

Figure 55:
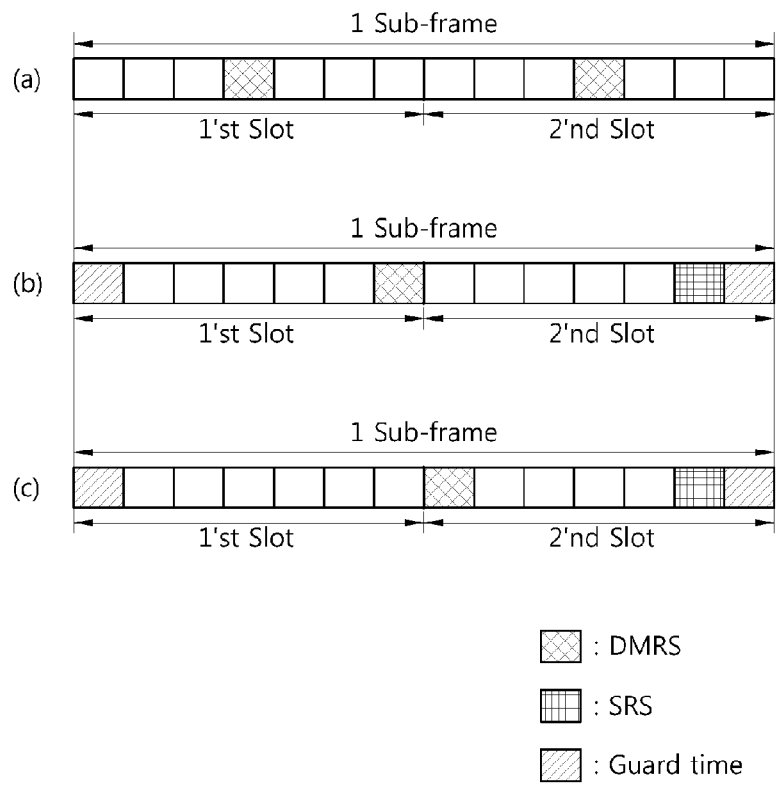

FIGS. 55 and 56 show the cases in which an SRS is additionally transmitted. Like in FIG. 54, a DMRS can be transmitted in any one of the sixth symbol of a first slot and the first symbol of a second slot. The SRS can be transmitted in the sixth symbol of the second slot or in the first symbol of the first slot.

Figure 58:
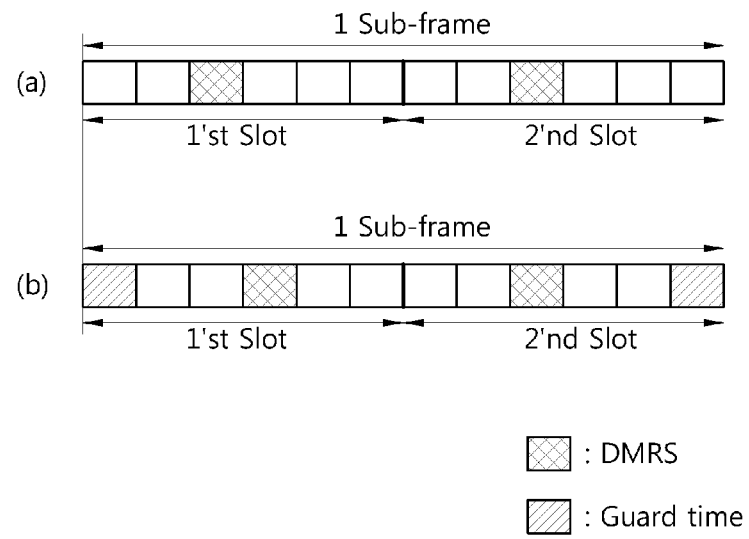

FIGS. 57 to 61 show embodiment in extended CPs corresponding to the embodiments in the normal CPs of FIGS. 53 to 56. In the case of the extended CP, one slot includes six symbols. A guard time is allocated to the first symbol of a first slot and the sixth symbol of a second slot. Accordingly, in the case in which the guard time is excluded, each of the first slot and the second slot includes five symbols. Referring to FIG. 58, in the backhaul subframe structure of FIG. 57, the DMRS of the first slot is delayed by one symbol and then transmitted.

Figure 59:
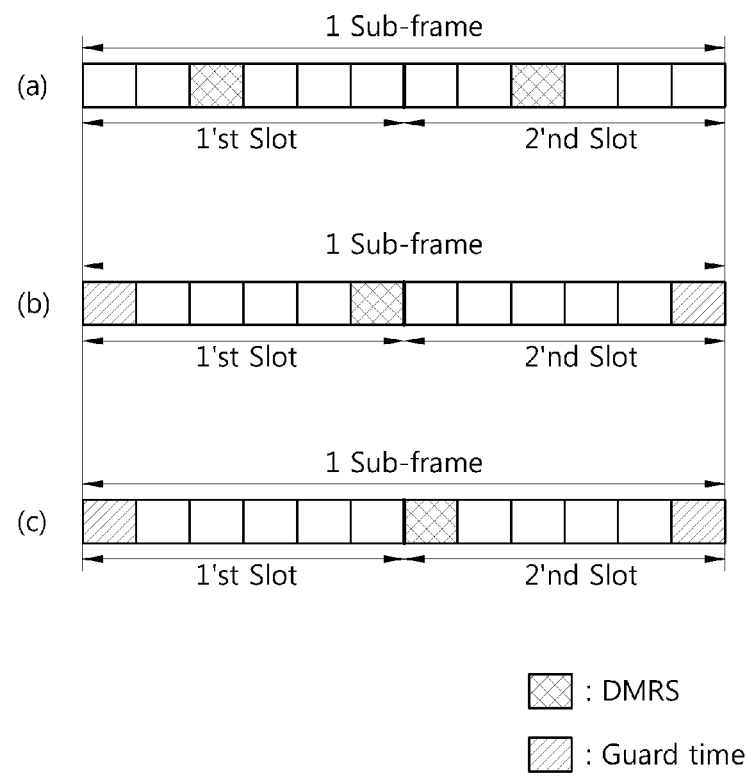
Figure 60:
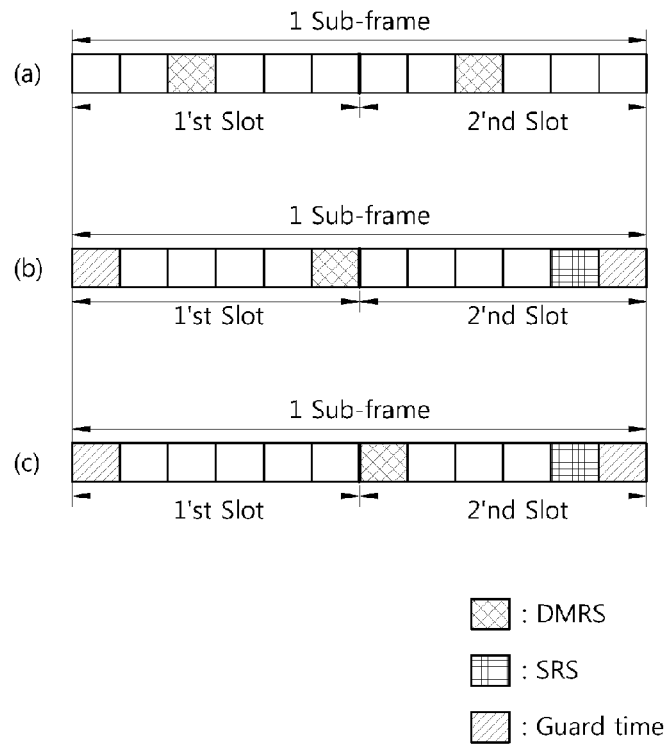
Figure 61:
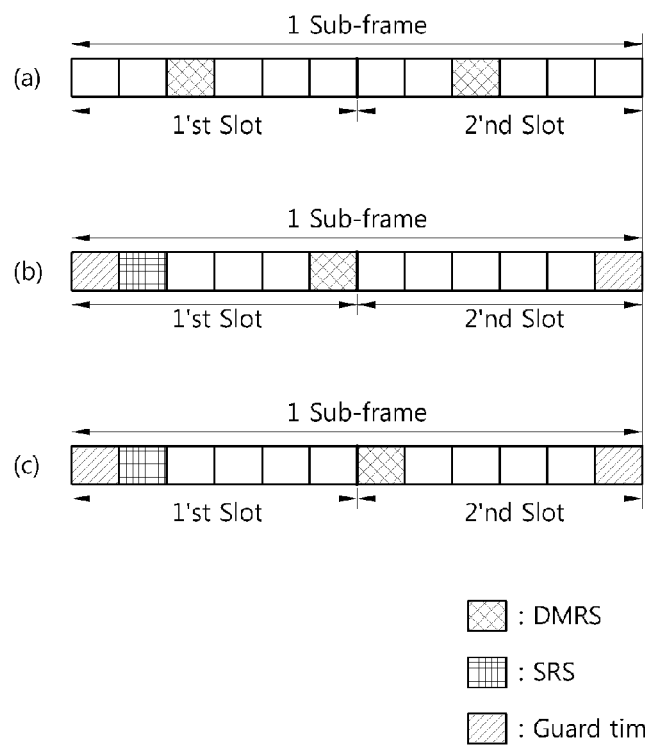

Accordingly, the DMRS is transmitted in the third symbol of the first slot and in the third symbol of the second slot. FIGS. 59 to 61 show the cases of non-slot hopping. A DMRS can be transmitted in any one of the fifth symbol of a first slot and the first symbol of a second slot. An SRS may not be transmitted or may be transmitted in the fifth symbol of the second slot or the first symbol of the first slot.

FIGS. 62 to 65 show another example of backhaul subframe structures according to a proposed method of transmitting a reference signal.

In the state in which a channel environment is relatively stabilized, it is sufficient that a DMRS is allocated to only one symbol. Furthermore, an SRS needs to be allocated within a subframe for the purpose of frequency-dependent scheduling while backward compatibility remains intact. Accordingly, the position in which a reference signal is transmitted can be regularly allocated irrespective of the position of a guard time or the number of occupied symbols using the method of efficiently using resources while transmitting a DMRS and an SRS at the same time. At the position where the reference signal is transmitted, the DMRS is transmitted in one symbol, and the SRS is transmitted in the other symbol. The position where the SRS is transmitted can be used as a position where the DMRS is transmitted if a bandwidth of the SRS occupies the resources of a backhaul link which are now being transmitted.

Figure 62:
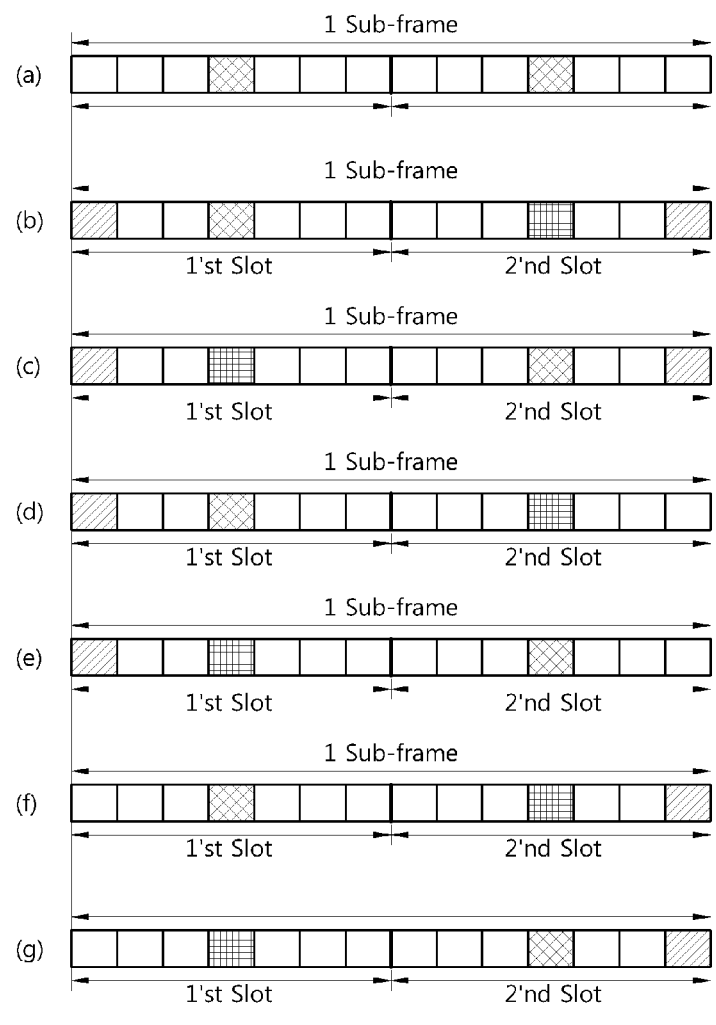
FIGS. 62 to 65 show another example of backhaul subframe structures according to a proposed method of transmitting a reference signal.
Figure 63:
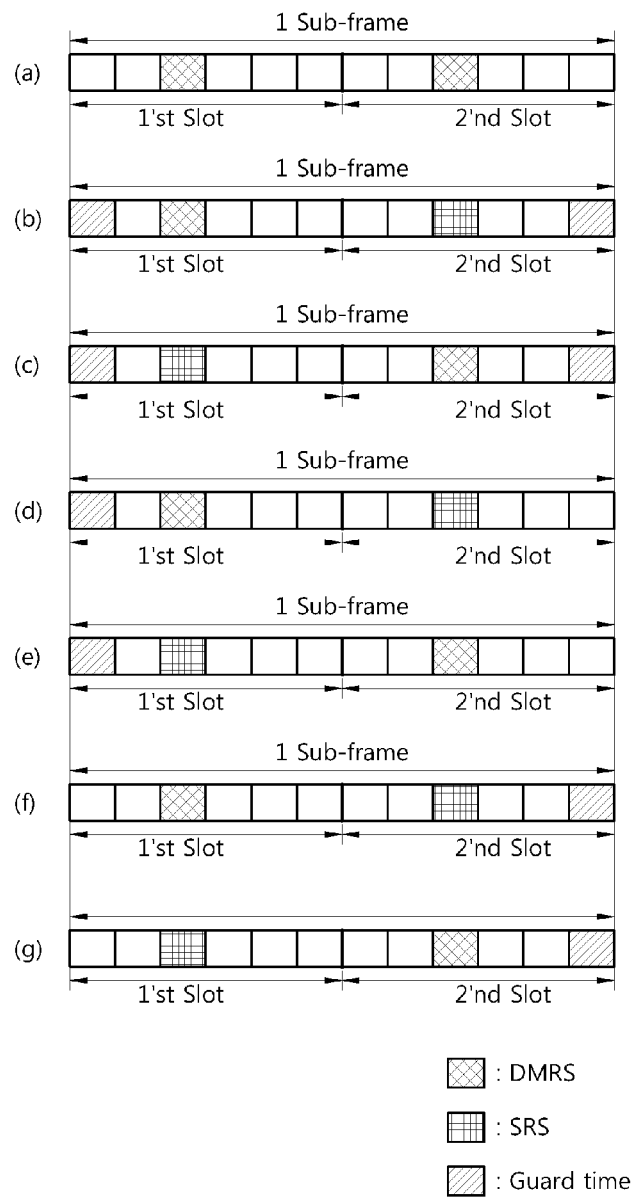

FIG. 62 shows the case of a normal CP. FIG. 62-(b) and 62-(c) shows the case in which two symbols are allocated to a guard time and the guard time is allocated to the first symbol of a first slot and the seventh symbol of a second slot. A DMRS and an SRS are respectively transmitted in the third symbol of the first slot and the fourth symbol of the second slot, and the positions of the DMRS and the SRS can be exchanged. FIG. 62-(d) to 62-(g) shows the case in which one symbol is allocated to a guard time. FIG. 62-(d) and 62-(e) shows the case in which a guard time is allocated to the first symbol of a first slot, and FIG. 62-(f) and 62-(g) shows the case in which a guard time is allocated to the seventh symbol of a second slot. Like in FIG. 62-(b) and 62-(c), a DMRS and an SRS are respectively transmitted in the third symbol of a first slot and the fourth symbol of a second slot, and the positions of the DMRS and the SRS can be exchanged. FIG. 63 shows an embodiment in an extended CP corresponding to the embodiment in the normal CP of FIG. 62.

Alternatively, two DMRSs and one SRS can be transmitted through a fading channel which is rapidly changed. The two DMRSs can be transmitted at regular positions irrespective of the position of a guard time or the number of symbols allocated to a guard time. Resources allocated to an SRS can be used to transmit a DMRS. In particular, if the bandwidth of an SRS occupies the resources of a backhaul link which are now being transmitted, the bandwidth can be used as a position where a DMRS is transmitted.

Figure 64:
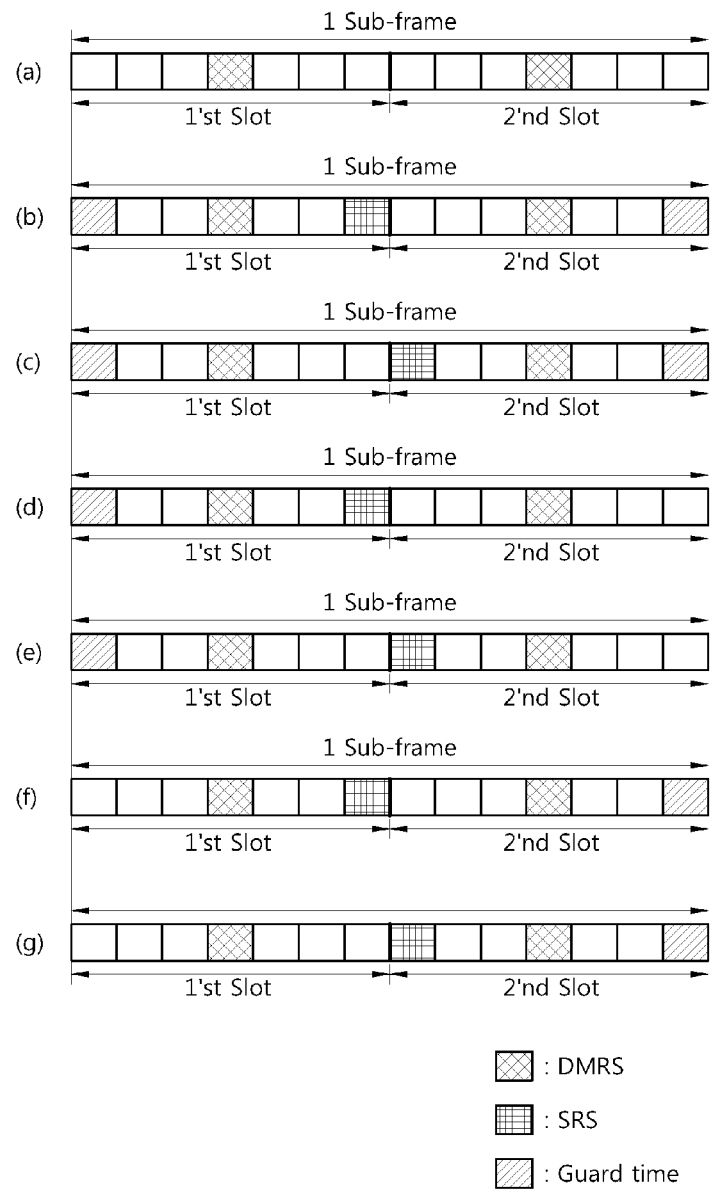
Figure 65:
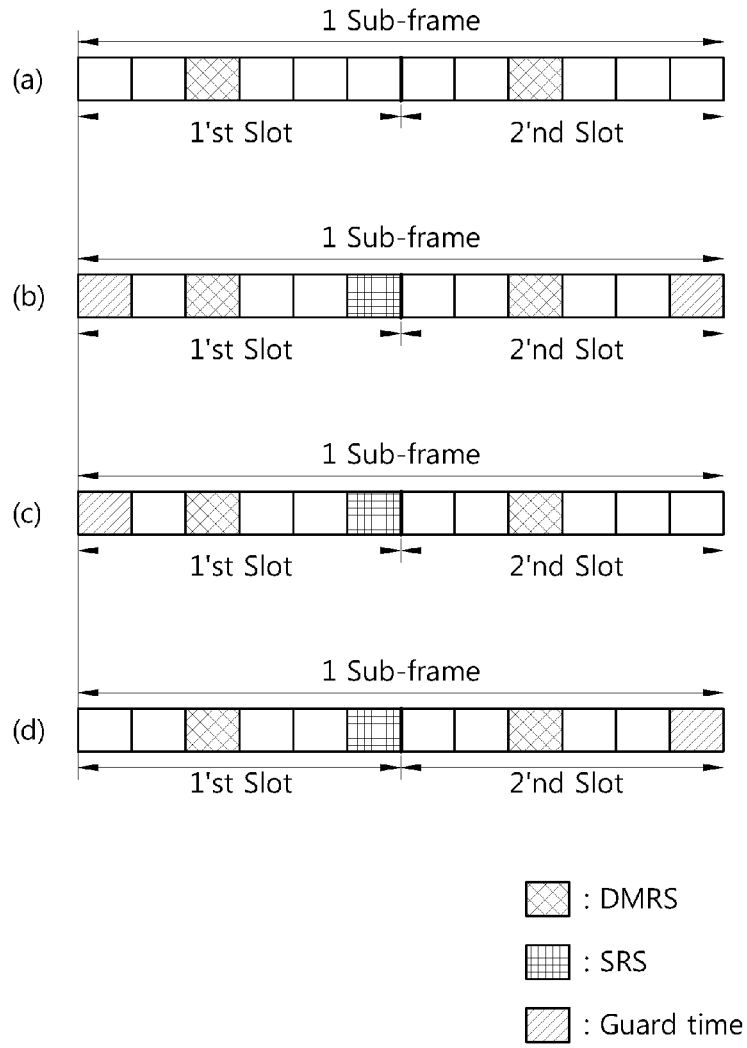

FIG. 64 shows the case of a normal CP. FIG. 64-(b) and 64-(c) shows the case in which two symbols are allocated to a guard time and the guard time is allocated to the first symbol of a first slot and to the seventh symbol of a second slot. A DMRS is transmitted in the third symbol of the first slot and the fourth symbol of the second slot. An SRS can be transmitted in the sixth symbol of the first slot or the first symbol of the second slot. FIG. 62-(d) to 62-(g) shows the case in which one symbol is allocated to a guard time. FIG. 62-(d) and 62-(e) shows the case in which a guard time is allocated to the first symbol of a first slot, and FIG. 62-(f) and 62-(g) shows the case in which a guard time is allocated to the seventh symbol of a second slot. Like in FIG. 62-(b) and 62-(c), a DMRS can be transmitted in the third symbol of a first slot and the fourth symbol of a second slot, and an SRS can be transmitted in the sixth symbol of the first slot or the first symbol of the second slot. FIG. 65 shows an embodiment in an extended CP, corresponding to the embodiment in the normal CP of FIG. 64.

Figure 66:
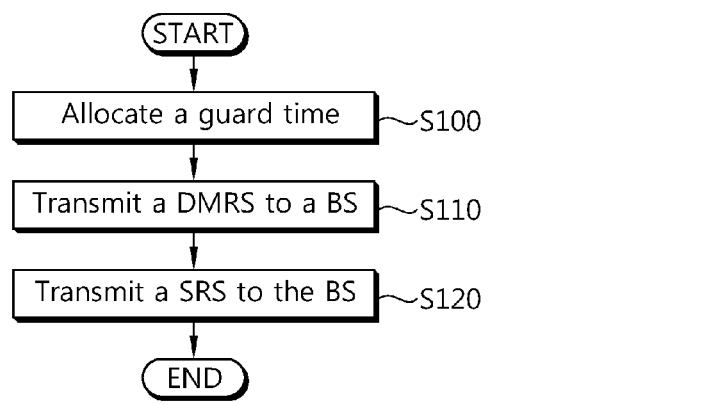
FIG. 66 shows an embodiment of a proposed method of transmitting a reference signal.

FIG. 66 shows an embodiment of a proposed method of transmitting a reference signal.

At step S100, a relay station allocates a guard time to the first or last portion of a backhaul subframe. The backhaul subframe can include a plurality of slots. The plurality of slots can include a plurality of OFDM symbols. The backhaul subframe can include two slots, and each of the slots can include six or seven OFDM symbols. The guard time is used to switch between the access link and the backhaul link. The guard time can include the first, first and the second OFDM symbols of the backhaul subframe or can include the last first and the second OFDM symbols of the backhaul subframe. Alternatively, the guard time can include the first and last ½ OFDM symbols of the backhaul subframe or the first and last one OFDM symbol of the backhaul subframe. In the case in which the guard time includes the first and last ½ OFDM symbols of the backhaul subframe, ½ symbol subsequent to the guard time allocated to the first ½ symbol of the backhaul subframe can be used for transmission of a data, a control signal or a reference signal. Or, the backhaul subframe can be delayed by a ½ OFDM symbol with respect to a base station subframe and then transmitted or can be advanced by a ½ OFDM symbol or a 1½ OFDM symbol and then transmitted. The base station subframe refers to an uplink subframe corresponding to the backhaul subframe from a viewpoint of a base station.

At step S110, the relay station transmits a DMRS in any one of the OFDM symbols of the backhaul subframe. The OFDM symbol for the DMRS does not overlap with the guard time. In the case in which the backhaul subframe is delayed by a ½ OFDM symbol with respect to the base station subframe and then transmitted or the backhaul subframe is advanced by a ½ OFDM symbol or a 1½ OFDM symbol and then transmitted, the OFDM symbol of the backhaul subframe in which the DMRS is transmitted and the OFDM symbol of the base station subframe in which the DMRS is received can be identical with each other in terms of time.

At step S120, the relay station transmits an SRS in any one of the OFDM symbols of the backhaul subframe. The OFDM symbol for the SRS does not overlap with the guard time.

Figure 67:
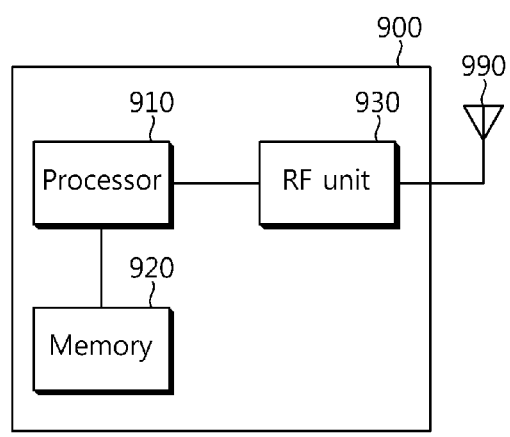
FIG. 67 is a block diagram of a relay station in which the embodiments of the present invention are implemented.

FIG. 67 is a block diagram of a relay station in which the embodiments of the present invention are implemented. A receiver 900 includes a processor 910, memory 920, and an RF unit 930.

Referring to FIG. 67, the processor 910 is configured to implement the proposed functions, processes, and/or methods. The processor 910 is configured to allocate a guard time to the first or last portion of a backhaul subframe and to transmit a DMRS to a base station in the OFDM symbol of the backhaul subframe. The backhaul subframe includes a plurality of slots, and each of the slots includes a plurality of OFDM symbols. The OFDM symbol for the DMRS does not overlap with the guard time. The layers of a wireless interface protocol can be implemented by the processor 910. The memory 920 is coupled to the processor 910 and is configured to store various pieces of information for driving the processor 910. The RF unit 930 is coupled to the processor 910 and is configured to transmit and/or receive a radio signal.

The processor 910 can include an Application-Specific Integrated Circuit (ASIC), other chipset, a logic circuit and/or a data processing apparatus. The memory 920 can include Read-Only Memory (ROM), Random Access Memory (RAM), flash memory, a memory card, a storage medium and/or other storage devices. The RF unit 930 can include a baseband circuit for processing a radio signal. In the case in which the embodiments are implemented in software, the above schemes can be implemented using a module (process, function or the like) for performing the above functions. The module can be stored in the memory 920 and can be executed by the processor 910. The memory 920 can be placed inside or outside the processor 910 and can be coupled to the processor 910 through well-known means.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of transmitting a reference signal performed by a Relay Station (RS) in a wireless communication system, the method comprising:
    allocating a guard time in the front of a backhaul subframe or the end of the backhaul subframe, the backhaul subframe comprising a plurality of slots, each of the plurality of slots comprising a plurality of symbols, the guard time being a time interval for switching between access link and backhaul link; and
    transmitting a Demodulation Reference Signal (DMRS) to a base station (BS) in a symbol of the backhaul subframe,
    wherein the symbol for the DMRS is not overlapped with the guard time,
    wherein the guard time comprises the first ½ and the last ½ symbol of the backhaul subframe,
    wherein the backhaul subframe is delayed or advanced for one of ½ symbols, 1 symbol, and 1½ symbols with reference to a base station subframe, which is a uplink subframe transmitted to the base station by a user equipment (UE) corresponding with the backhaul subframe, and
    wherein a position of a symbol of the BS subframe in which the DMRS is received by the BS is the same as a position of the symbol for the DMRS.

2. The method of claim 1, wherein a number of the slot is two.

3. The method of claim 1, wherein a number of the symbols in the slot is six or seven.

4. The method of claim 1, further comprising:
    transmitting a sounding reference signal (SRS) to the BS in a symbol of the backhaul subframe,
    wherein the symbol for the SRS is not overlapped with the guard time.

5. The method of claim 4, wherein the SRS is transmitted in the first symbol of the backhaul subframe or the last symbol of the backhaul subframe, the backhaul subframe excluding the guard time.

6. A Relay Station (RS) in a wireless communication system, the RS comprising:
    a RF unit; and
    a processor operatively coupled to the RF unit and configured to:
    allocate a guard time in the front of a backhaul subframe or the end of the backhaul subframe, the backhaul subframe comprising a plurality of slots, each of the plurality of slots comprising a plurality of symbols, the guard time being a time interval for switching between access link and backhaul link; and
    transmit a demodulation reference signal (DMRS) to a base station (BS) in a symbol of the backhaul subframe,
    wherein the symbol for the DMRS is not overlapped with the guard time,
    wherein the guard time comprises the first ½ and the last ½ symbol of the backhaul subframe,
    wherein the backhaul subframe is delayed or advanced for one of ½ symbols, 1 symbol, and 1½ symbols with reference to a base station subframe, which is a uplink subframe transmitted to the base station by a user equipment (UE) corresponding with the backhaul subframe, and
    wherein a position of a symbol of the BS subframe in which the DMRS is received by the BS is the same as a position of the symbol for the DMRS.

\* \* \* \* \*